(12) United States Patent
Xu et al.

(10) Patent No.: US 11,212,714 B2
(45) Date of Patent: Dec. 28, 2021

(54) METHOD FOR SUPPORTING HANDOVER AND CORRESPONDING BASE STATION AND NETWORK NODE

(71) Applicant: Samsung Electronics Co., Ltd., Suwon-si (KR)

(72) Inventors: Lixiang Xu, Beijing (CN); Hong Wang, Beijing (CN); Weiwei Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/374,191

(22) Filed: Apr. 3, 2019

(65) Prior Publication Data
US 2019/0313295 A1    Oct. 10, 2019

(30) Foreign Application Priority Data

Apr. 4, 2018 (CN) .......................... 201810305259.5

(51) Int. Cl.
*H04W 36/00* (2009.01)
*H04W 36/08* (2009.01)
(Continued)

(52) U.S. Cl.
CPC ... *H04W 36/0044* (2013.01); *H04W 28/0268* (2013.01); *H04W 36/08* (2013.01); *H04W 80/10* (2013.01); *H04W 88/10* (2013.01)

(58) Field of Classification Search
CPC . H04W 36/0044; H04W 36/08; H04W 80/10; H04W 88/10; H04W 28/0268
See application file for complete search history.

(56) References Cited

U.S. PATENT DOCUMENTS

| 2016/0157135 A1 | 6/2016 | Dinan |
| 2017/0013519 A1 | 1/2017 | Hahn et al. |

(Continued)

FOREIGN PATENT DOCUMENTS

| EP | 3 131 337 A1 | 2/2017 |
| KR | 10-2016-0129836 A | 11/2016 |
| WO | 2018/030982 A1 | 2/2018 |

OTHER PUBLICATIONS

3GPP TS 38.300 V15.0.0 TSGRAN (3rd Generation Partnership Project; Technical Specification Group Access Network; NR and NG-RAN Overall Description; Stage 2 (Release 15). Jan. 4, 2018. pp. 1-68 (Year: 2018).*

(Continued)

*Primary Examiner* — Jeffrey M Rutkowski
*Assistant Examiner* — Chae S Lee
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method for supporting handover and a corresponding base station and network node for performing the method is provided. The method includes forwarding data to a target base station, receiving a first end marker packet from a core network, and transmitting, for a quality of service, quality of service (QoS), flow for which the data forwarding has been completed, a second end marker packet to the target base station, the end marker packet containing a QoS flow (Continued)

identity (QFI). The methods of embodiments of the disclosure may reduce the packet transmission delay and improve the user experience.

12 Claims, 14 Drawing Sheets

(51) Int. Cl.
*H04W 80/10* (2009.01)
*H04W 88/10* (2009.01)
*H04W 28/02* (2009.01)

(56) References Cited

U.S. PATENT DOCUMENTS

| | | | |
|---|---|---|---|
| 2017/0041842 A1 | 2/2017 | Yoon et al. | |
| 2018/0083688 A1 | 3/2018 | Agiwal et al. | |
| 2019/0174377 A1* | 6/2019 | Decarreau | H04W 36/023 |
| 2019/0357076 A1* | 11/2019 | Han | H04W 28/0268 |
| 2019/0394669 A1* | 12/2019 | Han | H04W 80/08 |
| 2020/0015116 A1* | 1/2020 | Huang | H04W 36/00 |
| 2020/0120570 A1* | 4/2020 | Youn | H04W 8/08 |
| 2020/0275302 A1* | 8/2020 | Youn | H04W 28/0268 |
| 2020/0383151 A1* | 12/2020 | Wang | H04W 36/00 |
| 2020/0404732 A1* | 12/2020 | Shi | H04W 8/08 |

OTHER PUBLICATIONS

Ericsson: "Handling of End Marker in HO and DC", 3GPP Draft; R3-181242, 3rd Generation Partnership Project (3GPP), vol. RAN WG3, No. 99, Athens, Grace, Feb. 17, 2018 (Year: 2018).*
Ericsson: "23.502: end marker handling", 3GPP Draft; S2-178565 502 EMV7, 3RD Generation Partnership Project (3GPP), vol. SA WG2, No. 124, Reno, US, Nov. 21, 2017 (Year: 2017).*
International Search Report dated Jul. 12, 2019, issued in International Application No. PCT/KR2019/003980.
3GPP TS 38.300 V15.0 0 TSGRAN; 3rd Generation Partnership Project; Technical Specification Group Access Network; NR and NG-RAN Overall Description; Stage 2 (Release 15). Jan. 4, 2018. pp. 1-68.
Ericsson: "Handling of End Marker in HO and DC", 3GPP Draft; R3-181242, 3rd Generation Partnership Project (3GPP), Mobile Competence Centre ; 650, Route Des Lucioles ; F-06921 Sophia-Antipolis Cedex ; France , vol. RAN WG3, No. Athens, Grace; Feb. 26, 2018-Mar. 2, 2018 (Feb. 17, 2018), XP051401689, Feb. 17, 2018.
Ericsson: "23.502: end marker handling", 3GPP Draft; S2-178565 502 EMV7, 3rd Generation Partnership Project (3GPP), Mobile Competence Centre ; 650, Route Des Lucioles ; F-06921 Sophia-Antipolis Cedex ; France , vol. SA WG2, No. Reno, US; Nov. 27, 2017-Dec. 1, 2017, Nov. 21, 2017 (Nov. 21, 2017), XP051379577, Nov. 21, 2017.
Nokia et al.: "Handling of end markers in 5GS", 3GPP Draft; R3-180946 Endmarker, 3RD Generation Partnership Project (3GPP), Mobile Competence Centre ; 650, Route Des Lucioles ; F-06921 Sophia-Antipolis Cedex ; France,vol. RAN WG3, No. Athens, Greece; Feb. 26, 2018, Mar. 2, 2018 Feb. 16, 2018 (Feb. 16, 2018), XP051401537, Feb. 16, 2018.
ZTE Corporation: "Consideration on Inter-RAT mobility between eLTE and NR",3GPP Draft; R2-1706670 Consideration On Inter-Rat Mobility Between ELTE and NR, 3rd Generation Partnership Project (3GPP), Mobile Competence Centre ; 650, Route Des Lucioles ; F-06921 Sophia-Antipolis vol. RAN WG2, No. Qingdao, China; Jun. 27, 2017-Jun. 29, 2017, (Jun. 26, 2017), XP051301170, Jun. 26, 2017.
Samsung et al.: "End marker handling in H,and DC", 3GPP Draft; R3-183876 End Marker, 3rd Generation Partnership Project (3GPP),Mobile Competence Centre ; 650, Route Des Lucioles ; F-06921 Sophia-Antipolis Cedex; France , vol. RAN WG3, No. Montreal, Canada Jul. 2, 2018-Jul. 6, 2018 , (Jun. 26, 2018), XP051529758, Jun. 26, 2018.
European Search Report dated Mar. 25, 2021, issued in European Application No. 19780675.5.
Korean Office Action dated Nov. 9, 2021, issued in a counterpart Korean Application No. 10-2020-7027824.
Huawei et al., "TS 23.502 End-Marker during HO Procedure", SA WG2 Meeting #120, S2-172026, Mar. 21, 2017, Busan, Korea.
CATT, "TS 23.502: Indirect data forwarding for 5GS to EPS handover", SA WG2 Meeting #122bis, S2-175902, Aug. 15, 2017, Sophia Antipolis, France.

* cited by examiner

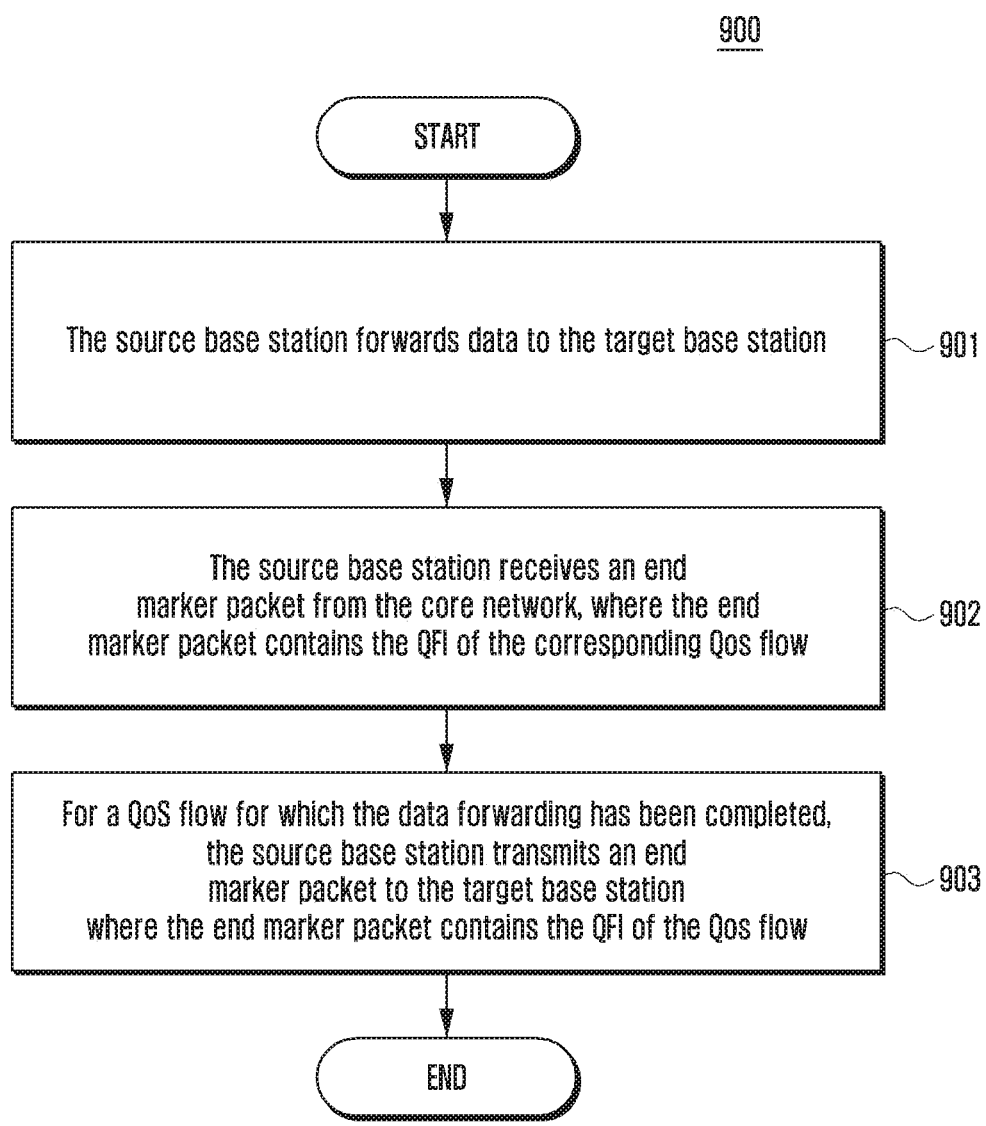

METHOD FOR SUPPORTING HANDOVER AND CORRESPONDING BASE STATION AND NETWORK NODE

CROSS-REFERENCE TO RELATED APPLICATION(S)

This application is based on and claims priority under 35 U.S.C. § 119(a) of a Chinese patent application number 201810305259.5, filed on Apr. 4, 2018, in the State Intellectual Patent Office, the disclosure of which is incorporated by reference herein in its entirety.

BACKGROUND

1. Field

The disclosure relates to wireless communication technologies. More particularly, the disclosure relates to a method for supporting handover and a corresponding base station and network node. The method includes a source base station forwards data packets to a target base station, the source base station receives an end marker packet from the core network, and sends an end marker packet to the target base station for a quality of service (QoS) flow when no more data needs to be forwarded for the QoS flow. The end marker packet to the target base station includes QoS flow identifier (QFI) of a QoS flow. With the method in this disclosure, the data transmission delay can be reduced and the user experience can be improved.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Modern mobile communications are increasingly tending to provide users with multimedia services transmitted at high speed.

FIG. 1 illustrates a system architecture diagram of system architecture evolution (SAE) according to the related art.

Referring to FIG. 1, a user equipment (UE) 101 is a terminal device for receiving data. The evolved universal terrestrial radio access network (E-UTRAN) 102 is a radio access network, which includes a macro base station (eNodeB/NodeB (eNB)) that provides the UE 101 with an interface to access a radio network. The mobility management entity (MME) 103 is responsible for managing the UE's mobile context, session context, and security information. The serving gateway (SGW) 104 primarily provides the functionality of user plane. Although the MME 103 and SGW 104 are shown as separate in FIG. 1, they may also be located in the same physical entity. The packet data network gateway (PGW) 105 is responsible for charging, lawful interception, and the like. The PGW 105 and the SGW 104 may also be located in the same physical entity. The policy and charging rules function entity (PCRF) 106 provides QoS policies and charging criteria. The general packet radio service support node (SGSN) 108 is a network node device in the universal mobile telecommunications system (UMTS) that provides routing for the transmission of data. The home subscriber server (HSS) 109 is the home ownership subsystem of the UE, and is responsible for maintaining user information including the current location of the user equipment, the address of the serving node, user security information, the packet data context of the user equipment, and the like.

FIG. 2 illustrates a system architecture diagram of a next generation network or a fifth generation (5G) network according to the related art.

Referring to FIG. 2, a UE 201 is a terminal device for receiving data. The next generation radio access network (NG-RAN) 202 is a radio access network, which includes a base station (gNB, or an eNB connected to the 5G core network (5GC)) that provides the UE 201 with an interface to access the radio network. The access and mobility management function (AMF) 203 is responsible for managing the UE's mobile context and security information. The user plane function entity (UPF) 204 mainly provides user plane functions. The session management function entity (SMF) 205 is responsible for session management. The data network (DN) 206 contains services such as carrier services, Internet access and third-party services.

When the UE moves between two NG-RAN base stations or moves between base stations of different systems (e.g. NG-RAN and long-term evolution (LTE)), an inter-cell handover may be performed. In the case of performing the handover, in order to ensure continuity of services, data forwarding between base stations is required. The source base station forwards fresh data that has not been transmitted to the UE and/or data that the UE has not acknowledged to the target base station. After receiving a path switching request message or a handover notification message from the target base station, the core network performs a user plane path switching. For the tunnel of each NG interface, the UPF transmits one or several end marker packets. Then, the UPF starts to transmit downlink packet to the target base station. The target base station first transmits the forwarded data received from the source base station, and then transmits the data received from the core network to the UE.

In the related art, the end marker packet is for each NG interface tunnel (i.e., for each packet data unit (PDU) session), and the source base station transmits an end marker to the target base station after the forwarding of all the data packets of the corresponding PDU session has been completed. The target base station can transmit data received from the core network to the UE only after receiving the end marker from the source base station, which will cause the delayed transmission of data packets of some QoS flow to the UE.

Therefore, a new handover support mechanism is needed, which can reduce the data interruption time during the handover process, ensure the service continuity and improve the user experience.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for supporting handover and a corresponding base station and network node for performing the method, which can address the delay problem of data transmitted to the user equipment (UE) in the data forwarding process, reduce the data interruption time, ensure the service continuity and improve the user experience. In the embodiments of the disclosure, during the data forwarding from the source base station to the target base station, it is not necessary to wait until the packets of all the quality of service (QoS) flows of the packet data unit (PDU) session are forwarded and then transmit the end marker on the corresponding tunnel. Instead, after the data forwarding for each QoS flow is completed, the end marker for this QoS flow is transmitted.

Additional aspects will be set forth in part in the description which follows and, in part, will be apparent from the description, or may be learned by practice of the presented embodiments.

In accordance with an aspect of the disclosure, a method performed at a source base station is provided. The method includes forwarding data to a target base station, receiving an a first end marker packet from a core network, and transmitting, for a quality of service (QOS) flow for which the data forwarding has been completed, a second end marker packet to the target base station, the second end marker packet containing a QoS flow identity (QFI).

Optionally, in some embodiments, the first end marker packet from the core network contains the QFI.

Optionally, in some embodiments, both the source base station and the target base station belong to a network supporting QoS flows.

Optionally, in some embodiments, the source base station belongs to a network supporting QoS flows and the target base station belongs to a network not supporting QoS flows.

Optionally, in some embodiments, the forwarding of the data to the target base station includes forwarding data directly to the target base station or forwarding data to the target base station via the core network.

In accordance with another aspect of the disclosure, a method performed at a core network node is provided. The method includes receiving forwarded data from a source base station, transmitting the data to a target base station, receiving a first end marker packet from the source base station for a data bearer corresponding to the data when the corresponding forwarding of the data has been completed, generating a second end marker packet for a quality of service (QoS) flow corresponding to the data bearer, and transmitting the second end marker packet to the target base station, according to the mapping between a QoS flow and a data bearer, the end marker packet containing a QoS flow identity (QFI).

In accordance with another aspect of the disclosure, a method performed at a target base station is provided. The method includes receiving forwarded data from a source base station and data from a core network, receiving, from the core network, an end marker packet, the end marker packet containing a quality of service (QoS) flow identity (QFI), and starting the transmission of the second data from the core network for the QoS flow indicated by the QFI.

In accordance with another aspect of the disclosure, a base station is provided. The base station includes a processor and a memory, coupled to the processor, configured to store machine readable instructions that, when executed by the processor, configure the processor to perform the method of the first aspect.

In accordance with another aspect of the disclosure, a base station is provided. The base station includes a processor and a memory, coupled to the processor, configured to store machine readable instructions that, when executed by the processor, configure the processor to perform the method of the second aspect.

In accordance with another aspect of the disclosure, a core network node is provided. The core network node includes a processor and a memory, coupled to the processor, configured to store machine readable instructions that, when executed by the processor, configure the processor to perform the method of the above third aspect.

In accordance with another aspect of the disclosure, non-volatile storage medium storing machine-executable instructions for implementing methods corresponding to the first, second, or third aspect when executed by a machine is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 illustrates a handover supporting method 3 according to an embodiment of the disclosure;

The same or similar elements in the drawings are identified by the same or similar reference numerals.

DETAILED DESCRIPTION

Figure 1:
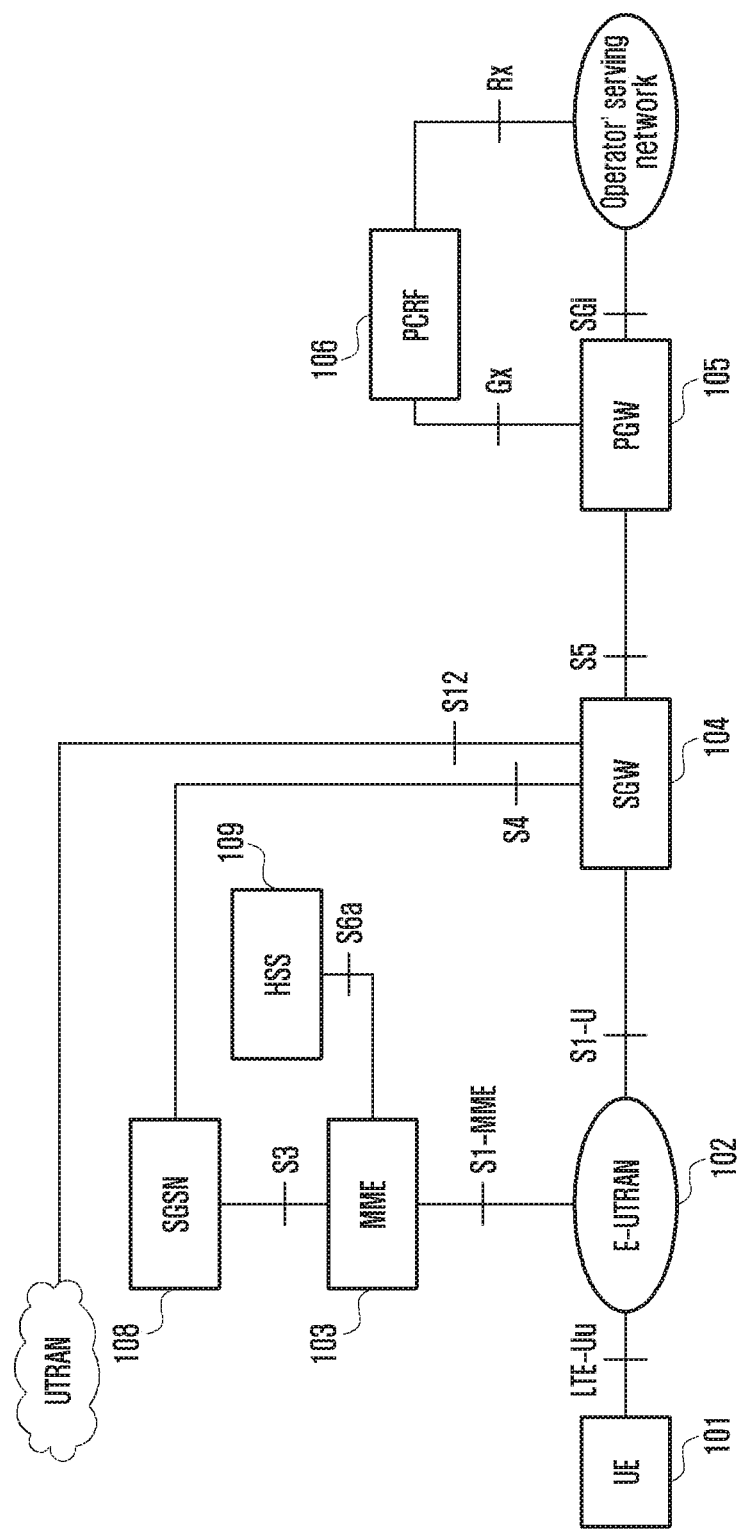
FIG. 1 illustrates a system architecture diagram of system architecture evolution (SAE) according to the related art.
Figure 2:
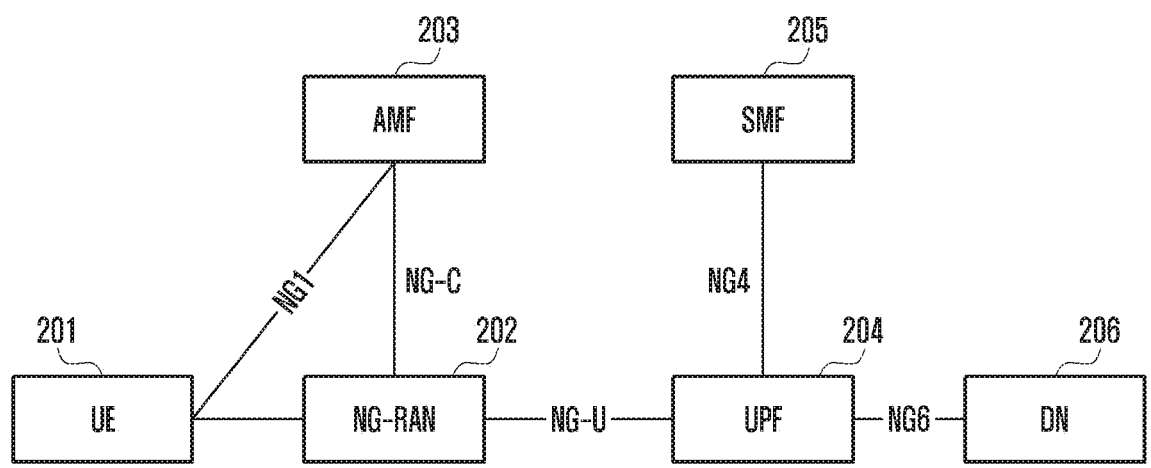
FIG. 2 illustrates a system architecture diagram of a next generation network or a fifth generation (5G) network according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The method for supporting handover and the corresponding base station and network node proposed by the disclosure will be described in detail below with reference to the accompanying drawings and specific embodiments.

It should be noted that the disclosure should not be limited to the particular embodiments described below. In addition, detailed descriptions of well-known technologies that are not directly related to the disclosure are omitted for the sake of brevity in order to prevent any obscure understanding of the disclosure.

As stated previously, when the user equipment (UE) moves between two next generation radio access network (NG-RAN) base stations or moves between base stations of different systems (e.g. 5G system (5GS) and evolved packet system (EPS), an inter-cell handover may be performed. In the case of performing the handover, in order to ensure continuity of services, data forwarding between base stations is required. The source base station forwards fresh data that has not been transmitted to the UE and/or data that the UE has not acknowledged to the target base station. In the related art, for each packet data unit (PDU) session, the target base station first transmits the forwarded data received from the source base station, and then, after all the forwarded data of this PDU session has been received from the source base station and transmitted to the UE, the data received from the core network is transmitted to the UE. This will result in delays in data transmission and even longer data interruptions.

To this end, embodiments of the disclosure provide a method for supporting handover and a corresponding base station and network node for performing the method. In the embodiment of the disclosure, during the data forwarding from the source base station to the target base station, after the data forwarding for each quality of service (QoS) flow is completed, the end marker for this QoS flow is transmitted. The target base station first transmits the packets forwarded from the source base station to the UE. After receiving the end marker packet for the QoS flow, the target base station knows that the source base station has completed the forwarding of data of the corresponding QoS flow, and then may start to transmit the data of the QoS flow received from the core network to the UE according to the QoS flow identifier (QFI) in the header of the received end marker packet. The above method for transmitting the end marker packet is mainly for fresh data, that is, the end marker is mainly transmitted for data forwarding on each PDU session tunnel. Regarding data forwarding on the data radio bearer tunnel (DRB), when there is no data available for forwarding on the tunnel of the DRB and an end marker packet for the PDU session is received from the core network, the source base station transmits, on the tunnel of the DRB, one or more general packet radio services (GPRS) tunneling protocol (GTP) user data tunneling (GTP-U) end marker packets to the target base station, where the end marker packets do not contain the QFI. According to the embodiments of the disclosure, the delay problem of data transmitted to the UE in the data forwarding process can be addressed, the data interruption time can be reduced, the service continuity is ensured and the user experience is improved.

Figure 3:
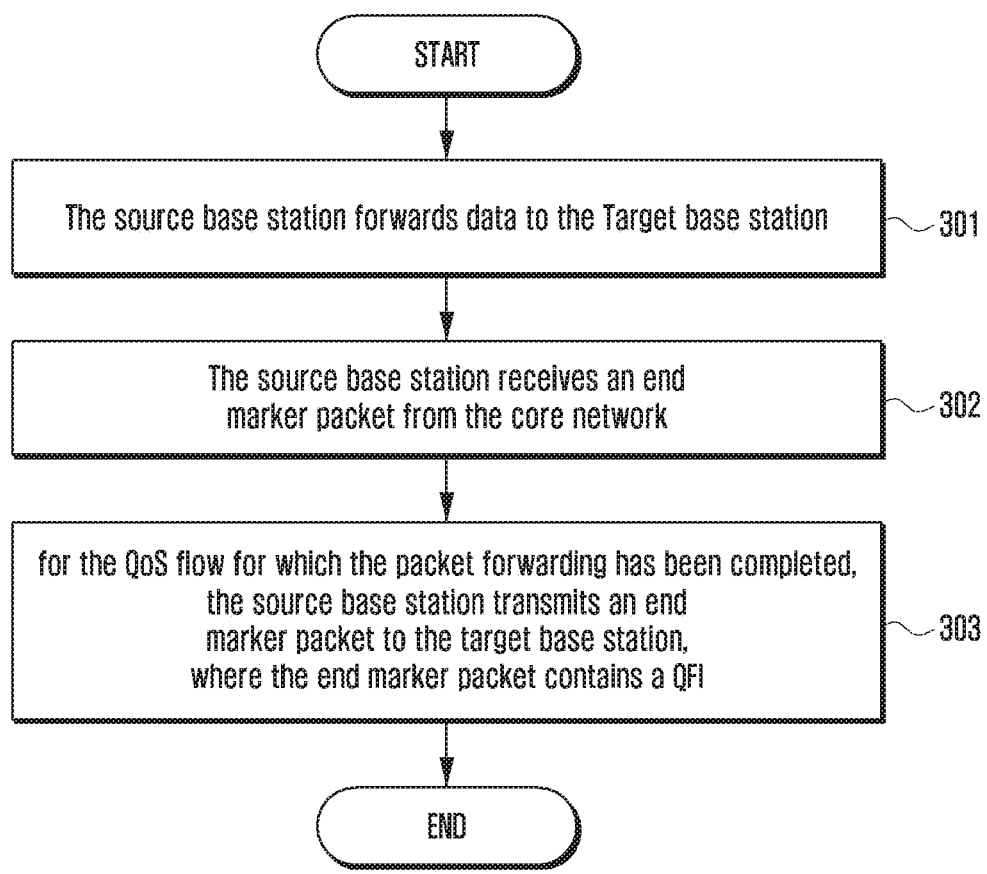
FIG. 3 illustrates a handover supporting method 1 of the disclosure.

FIG. 3 illustrates a handover supporting method 1 of the disclosure according to an embodiment of the disclosure.

The handover supporting method 1 of the disclosure is illustrated in FIG. 3. The method includes steps of:

In operation 301, the source base station forwards data to the target base station. The data forwarding may be direct data forwarding between the source base station and the target base station or indirect data forwarding via the core network. The data forwarded by the source base station to the target base station includes fresh data that has not been transmitted to the UE and/or data that the UE has not acknowledged. Specifically, the source base station may forward fresh data that has not been transmitted to the UE to the target base station via a tunnel for a PDU session. The fresh data that has not been transmitted to the UE is, for example, a service data adaptation protocol (SDAP) service data unit (SDU). The source base station may transmit data that the UE has not acknowledged via a tunnel of a DRB, where the data that the UE has not acknowledged contains a packet data convergence protocol (PDCP) PDU and/or a PDCP SDU.

In operation 302, the source base station receives an end marker packet from the core network.

In operation 303, for the QoS flow for which the packet forwarding has been completed, the source base station transmits an end marker packet to the target base station via a tunnel of the PDU session where the QoS flow is located, where the end marker packet contains a QFI of the QoS flow. For fresh data, i.e. data forwarding on the tunnel for each PDU session, as described above, the source base station transmits an end marker for the QoS flow. Regarding data forwarding on the DRB, when there is no data available for forwarding on the tunnel of the DRB and an end marker packet for the PDU session is received from the core network, the source base station transmits, on the tunnel of the DRB, one or more GTP-U end marker packets to the target base station, where the end marker packets do not contain the QFI.

Particularly, in a next generation network or a fifth generation (5G) network, the concept of QoS flow is introduced. Data of multiple QoS flows in a PDU session is transmitted on the tunnel of this PDU session. The embodiment of the disclosure proposes that, for the QoS flow for which the packet forwarding has been completed, the source base station transmits an end marker to the target base station via a tunnel of the PDU session where the QoS flow is located. The end marker packet contains the QFI of the QoS flow. According to the embodiment of the disclosure, the source base station does not need to wait until the packets of all the QoS flows of the PDU session are forwarded and then transmit the end marker on the corresponding tunnel. Instead, the source base station transmits an end marker individually after the data forwarding for each QoS flow has been completed, and the end marker packet contains a corresponding QFI. Particularly, the source base station adds the QFI to the header of the end marker packet.

The target base station first transmits the packets forwarded from the source base station to the UE. The target base station receives the end marker packet from the source base station, and, according to the QFI in the header, the target base station starts to transmit the data received by the QoS flow from the core network to the UE. For the QoS flow for which no end marker packet was received, the target base station then transmits the forwarded data received from the source base station or waits for the data forwarded from the source base station or the end marker, and starts to transmit packets received from the core network until it receives a corresponding end marker from the source base station.

At this point, the description of the handover supporting method 1 of the disclosure is completed. By using the method, the source base station transmits an end marker packet for each QoS flow in the PDU session, the target base station can know that the data forwarding of each QoS flow ends, and then start to transmit the packet received from the core network as soon as possible, thereby reducing the packet transmission delay in the data forwarding, and improving the user experience.

Figure 4:
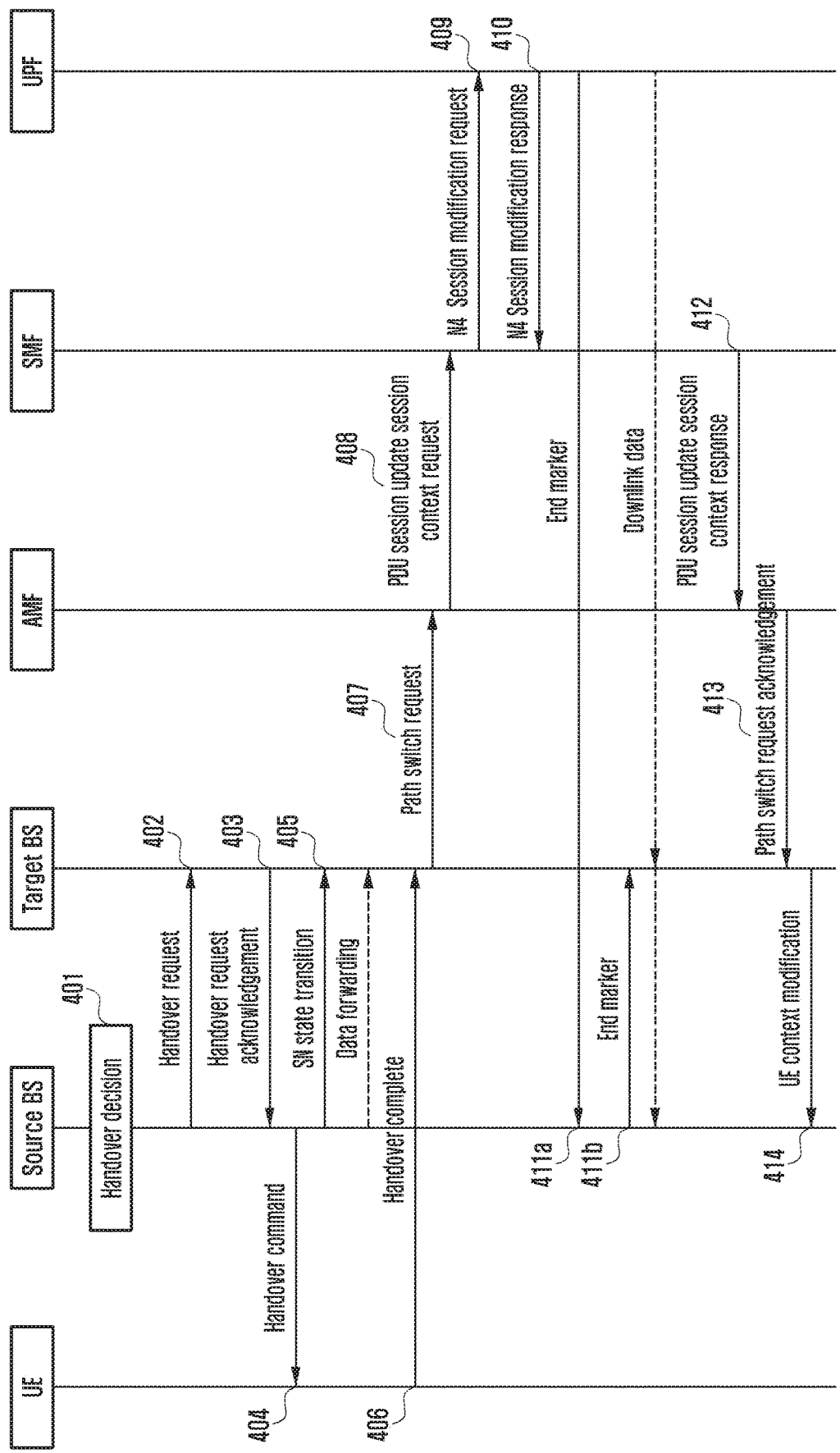
FIG. 4 illustrates a handover supporting method 1 of the disclosure, i.e., the Xn handover in the 5G system (5GS) according to an embodiment of the disclosure.

FIG. 4 illustrates an embodiment of the handover supporting method 1 of the disclosure, i.e., the Xn handover in the 5GS according to an embodiment of the disclosure.

An embodiment of the handover supporting method 1 of the disclosure, i.e., the Xn handover in the 5GS system, is illustrated in FIG. 4. The source base station and the target base station according to the embodiment are base stations in NG-RAN, and may be gNBs or connected to an LTE base station in the 5GC (e.g. ng-eNB). Detailed descriptions of the steps unrelated to the disclosure are omitted here. This embodiment includes steps of:

In operation 401, a source base station decides to initiate a handover of a UE.

In operation 402, the source base station transmits a handover request message to a target NG-RAN node (i.e. target base station). The message contains information of the PDU session to be established. The information of the PDU session contains information of a QoS flow to be established in the PDU session. The information of the QoS flow contains the QFI and the downlink data forwarding proposed by the source base station for the QoS flow. The message contains a mapping from the source base station DRB to the QoS flow. The contained DRB information indicates that the source base station proposes a data forwarding for the DRB.

In operation 403, the target base station transmits a handover request acknowledgement message to the source base station.

The target base station decides whether to apply the same DRB configuration and the same QoS-flow-to-DRB mapping as the source base station, or a full configuration.

If the target base station decides to apply the same DRB configuration and the same QoS-flow-to-DRB mapping as the source base station, the target base station allocates downlink data forwarding tunnel information for each DRB for which the data forwarding is needed. The target base station may also simultaneously allocate downlink data forwarding tunnel information for the PDU session for which the data forwarding is needed. If the target base station accepts the data forwarding for the QoS flow in the PDU session as proposed by at least one source base station, the target base station allocates data forwarding tunnel information for the corresponding PDU session.

If the target base station applies the full configuration, the target base station accepts the data forwarding for the QoS flow in the PDU session as proposed by at least one source base station, and the target base station allocates data forwarding tunnel information for the corresponding PDU session.

The target base station informs the source base station of the allocated downlink data forwarding tunnel information. The data forwarding tunnel information contains data forwarding tunnel information for the PDU session and/or data forwarding tunnel information for the DRB.

If the source base station proposes a data forwarding for the QoS flow in the PDU session, and if the QoS flow is successfully established and the target base station accepted the data forwarding for the QoS flow, the target base station may allocate data forwarding tunnel information for the PDU session where the QoS flow is located. The corresponding target base station accepted the data forwarding for the QoS flow, and the target base station transmits indication information for the acceptance of the data forwarding to the source base station, then the source base station knows the QoS flows in the PDU session for which the data forwarding is accepted by the target base station. The target base station transmits the allocated tunnel information of the corresponding PDU session to the source base station.

If the source base station proposes the data forwarding for the DRB in the PDU session, and if the DRB is successfully established, the target base station may also allocate user plane tunnel information for each DRB for which the data forwarding is needed, where the tunnel information contains a transport layer address and a tunnel endpoint identifier (TEID). By using the user plane tunnel information of the corresponding DRB, the source base station may know that the target base station accepts the data forwarding for the DRB.

The handover request acknowledgement message also contains a destination-to-source transparent transmitter. The message contains a list of established PDU sessions and/or a list of PDU sessions which are not successfully established. The message may further contain a list of DRBs established in the PDU session and/or a list of DRBs which are not successfully established. For the established DRB, the indication information for the acceptance of the data forwarding by the target base station is also included. The message may further contain QoS flows established in the PDU session and/or QoS flows which are not successfully established. For the established QoS flows, the indication information for the acceptance of the data forwarding by the target base station is also included.

In operation 404, the source base station transmits a handover command message to the UE.

The source base station performs downlink data forwarding according to the received downlink data forwarding tunnel information allocated by the target base station.

The source base station transmits a PDCP packet that the UE did not acknowledge to the target base station via the tunnel of the DRB allocated by the target base station. The PDCP packet contains a PDCP Protocol Data Unit (PDU) and/or a PDCP SDU. If the source base station fails to receive the data forwarding tunnel of the corresponding DRB allocated by the target base station, the PDCP packet on the DRB does not need to be forwarded, and the source base station directly discards the corresponding packet.

Then fresh data, such as a SDAP SDU, may be processed by the source base station into a PDCP packet, and then transmitted to the target base station via the DRB tunnel. Alternatively, the source base station forwards the QoS flow in the fresh data, for which the target base station accepts the data forwarding, to the target base station via the tunnel of the corresponding PDU session.

In operation 405, the source base station transmits a sequence number (SN) state transition message to the target base station. The message contains a downlink transmission state and an uplink reception state of the data on the DRB by the source base station.

In operation 406, the UE transmits a handover complete message to the target base station.

In operation 407, the target base station transmits a path switch request message to the access and mobility management function (AMF).

In operation 408, the AMF transmits a PDU session update session SM context request message to the session management function entity (SMF). The message contains downlink user plane tunnel information for each PDU session allocated by the target base station.

In operation 409, the SMF transmits an N4 session modification request message to the user plane function entity (UPF). The SMF transmits the downlink user plane tunnel information allocated by the target base station to the UPF.

In operation 410, the UPF transmits an N4 session modification response message to the SMF.

In operation 411a, the UPF transmits one or more end marker packets to the source base station on the NG tunnel of each PDU session.

In operation 411b, for the QoS flow for which the packet forwarding has been completed, the source base station transmits an end marker to the target base station via a tunnel of the PDU session where the QoS flow is located. The end marker packet contains the QFI of the QoS flow. The source base station does not need to wait until the packets of all the QoS flows of the PDU session are forwarded and then transmit the end marker on the corresponding tunnel. The source base station transmits an end marker individually after the data forwarding for each QoS flow has been completed, and the end marker packet contains a corresponding QFI. The source base station adds the QFI to the header of the end marker packet. For fresh data, i.e. data forwarding on the tunnel for each PDU session, as described above, the source base station transmits an end marker for the QoS flow. Regarding data forwarding on the DRB, when there is no data available for forwarding on the tunnel of the DRB and an end marker packet for the PDU session is received from the core network, the source base station transmits, on the tunnel of the DRB, one or more GTP-U end marker packets to the target base station, where the end marker packets do not contain the QFI.

The UPF starts to transmit downlink packet to the target station.

The target base station first transmits the packets forwarded from the source base station to the UE. For the data forwarded on the tunnel of the PDU session, the target base station receives the end marker packet from the source base station, and, according to the QFI in the header, the target base station starts to transmit the data received by the QoS flow from the core network to the UE. For the QoS flow for which no end marker packet was received, the target base station then transmits the forwarded data received from the source base station, and starts to transmit packets received from the core network until it receives a corresponding end marker from the source base station. The target base station may first transmit the forwarded data received from the corresponding DRB tunnel to the UE, and then transmit the forwarded data received from the tunnel of the PDU session to the UE, and then transmit the data received from the UPF to the UE.

In operation 412, the SMF transmits a PDU session update session context response message to the AMF.

In operation 413, the AMF transmits a path switch request acknowledgement message to the target base station.

In operation 414, the target base station transmits a UE context release message to the source base station.

Thus, the description about the first embodiment of method 1 of the disclosure has been completed. By using the method, it may start the transmission of the packets received from the core network as soon as possible, so as to reduce the packet transmission delay during the data forwarding and improve the user experience.

The above is an embodiment of an intra-system Xn handover. For the direct data forwarding of the NG handover, the behaviors of the source base station and the target base station are the same as those in the first embodiment, and details will not be provided herein again. For the indirect data forwarding of the NG handover, the source base station performs data forwarding via the core network. The source base station, as same as what described in the method of FIG. 3 and the embodiment of FIG. 4, transmits an end marker to the core network, and adds a QFI in the header of the packet. In this way, the UPF can directly forward the received end marker to the target base station, which, as same as a normal data forwarding process, does not require additional processing, avoids the impact on the UPF, and can achieve the target that the target base station transmits the packet received from the core network to the UE as soon as possible, so as to reduce the data forwarding delay during the handover process.

Figure 5A:
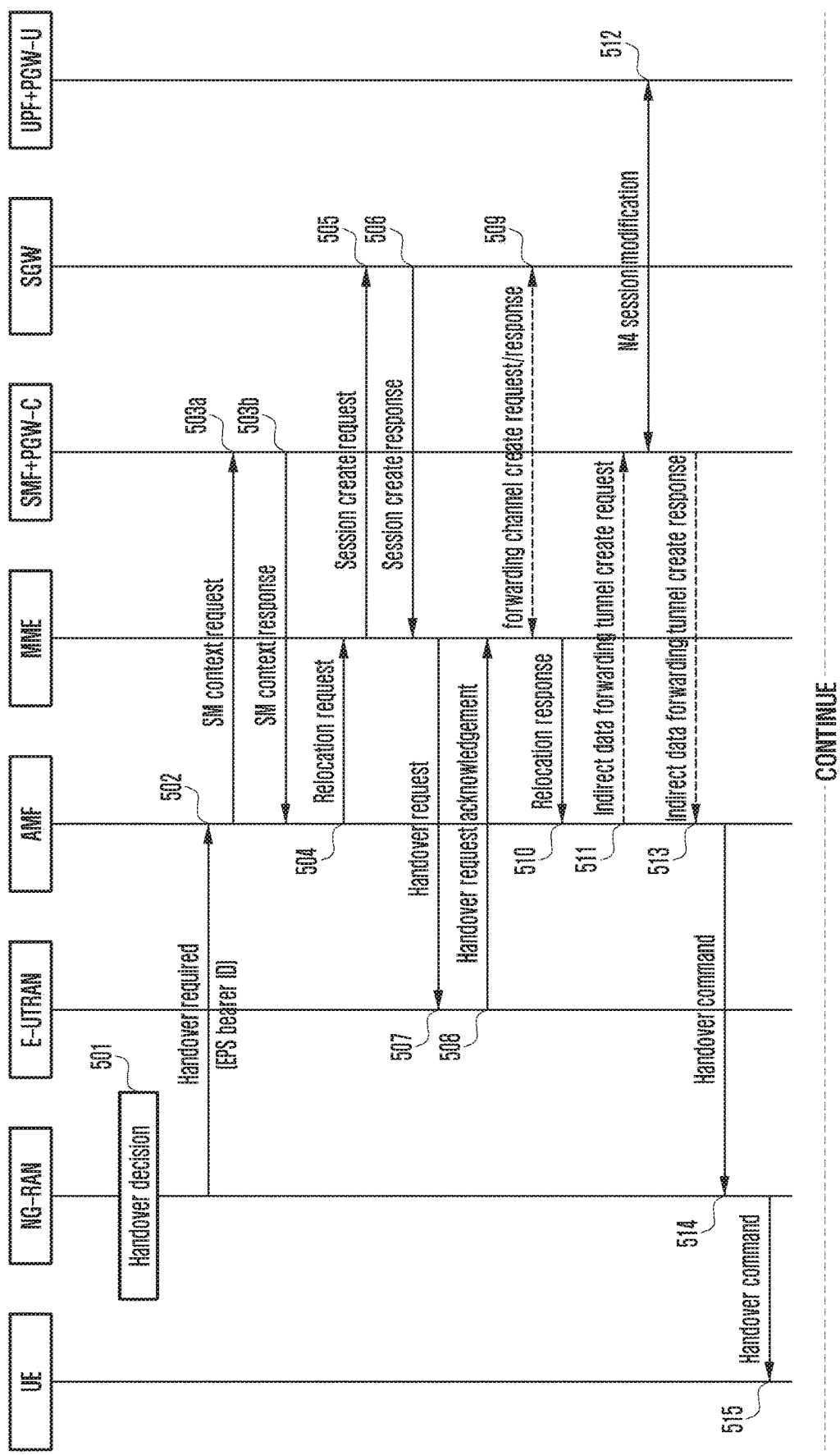
FIGS. 5A and 5B illustrate a handover supporting method 1 of the disclosure, for the handover from the 5GS to the evolved packet system (EPS) according to various embodiments of the disclosure.
Figure 5B:
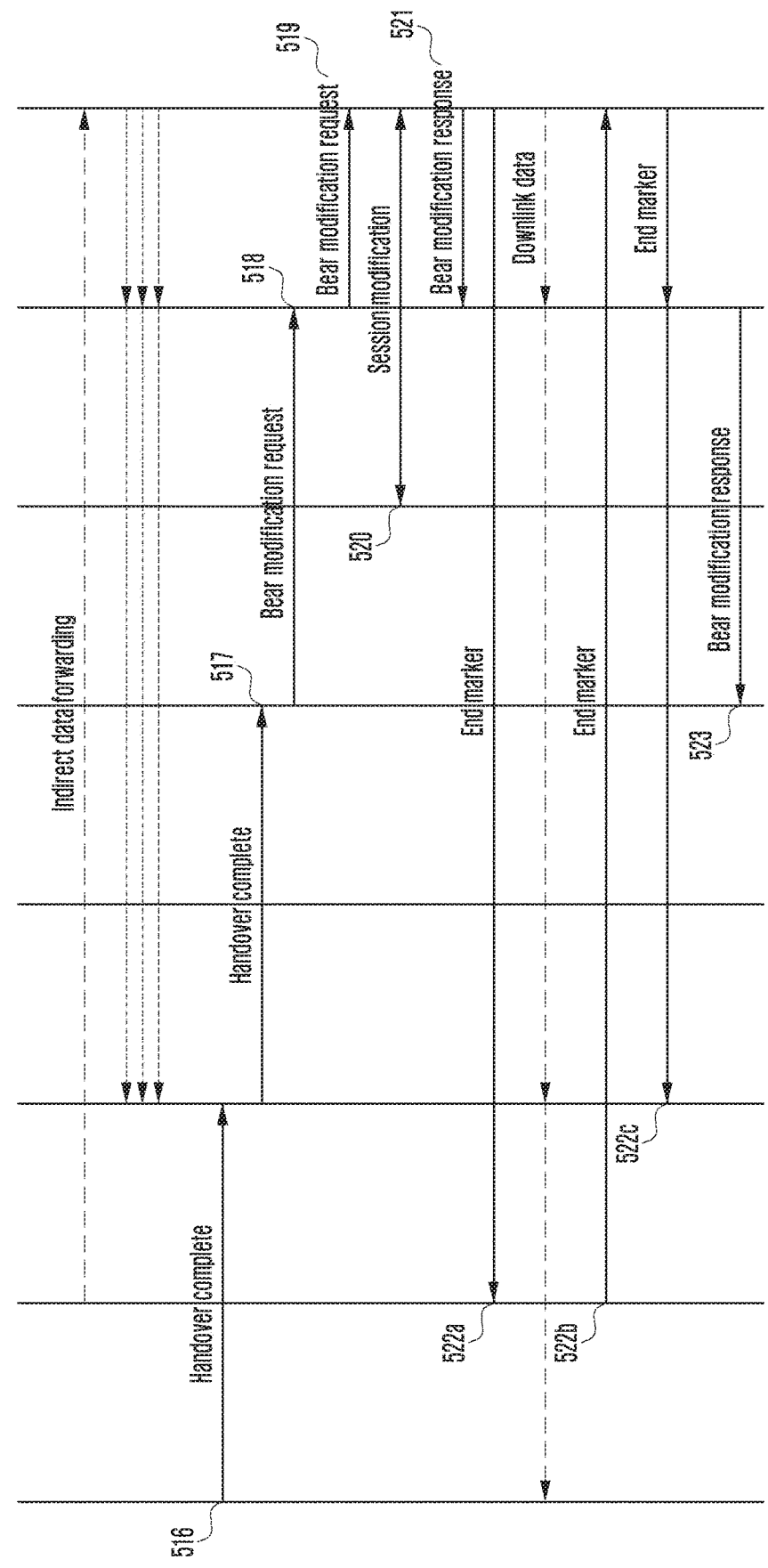

FIGS. 5A and 5B illustrate a handover supporting method 1 of the disclosure, for the handover from the 5GS to the EPS according to various embodiments of the disclosure.

A second embodiment of the handover supporting method 1 of the disclosure for the handover from the 5GS to the EPS, is illustrated in FIGS. 5A and 5B. Detailed descriptions of the steps unrelated to the disclosure are omitted here. This embodiment includes steps of:

In operation 501, the NG-RAN decides to hand over the UE to the E-UTRAN.

The E-UTRAN here may be an eNB connected to the EPC. The NG-RAN may be a gNB, or a centralized unit (CU) in an eNB or gNB connected to the 5GC.

The user plane path before handover is UPF to NG-RAN. The SGW needs to support the interface with UPF. The UPF may contain the function of the PGW user plane to perform the function of the user plane anchor during different inter-RAT handovers.

In operation 502, the NG-RAN transmits a handover required message to the AMF. The message contains the identity of the target eNB and a source-to-target transparent transmitter. The source-to-target transparent transmitter contains an E-UTRAN radio access bearer E-RAB identity and a downlink data forwarding proposed for the E-RAB. The NG-RAN obtains an EPS bearer identity mapped to the QoS flow in the PDU session by the PDU session establishment process or the handover process. It is also possible to obtain mapped EPS QoS information. The NG-RAN decides whether to propose the data forwarding according to the mapping of the QoS flow to the E-RAB and the QoS information. The NG-RAN may consider other factors (such as whether there is data in the buffer) to make the decision without affecting the main content of the disclosure.

The handover required message may further contain a list of EPS bearer information. The EPS bearer information contains an EPS bearer identity and QoS information of the EPS bearer.

The message further contains identification information indicating the MME to which the target eNB is connected. The identification information may be a tracking area identity or an MME identity.

The NG-RAN informs the AMF of the type of handover. The type of handover comprise that the handover is an intra-NR handover, a handover from the NR to the LTE, a handover from the NR to the UTRAN, or a handover from the NR to the GSM EDGE radio access network (GERAN) and/or GSM. Corresponding to the handover from the NR to the LTE, the NG-RAN informs the AMF whether the target base station of the handover is a base station connected to the 5G core network or the handover is a handover between different systems. This is because the LTE base station eNB may and may not support an interface with the 5GC. If the target base station is also connected to the 5GC, it is a handover within the 5G system. If the target base station is not connected to the 5GC but to the EPC, it is a handover between different systems. The NG-RAN may inform the AMF that the handover is a handover between different systems by including, in the handover required message, the information of the inter-system handover or the information that the target base station has no interface with the 5GC. If the identity length of the eNB connected to the 5GC is different from that of the eNB without connection to the 5GC, the 5GC may determine whether the handover is an inter-system handover according to the length of the target base station identity contained in the received handover required message. If the identity information of the MME connected to the target base station is different from the identity definition of the AMF node (for example, different in length), the 5GC may determine whether the handover is an inter-system handover according to the length of the core network identity connected to the target base station contained in the received handover required message. Alternatively, the NG-RAN informs the AMF of the handover type by directly setting the handover type in the handover required message as the handover from the NR to the eNB connected to the EPC or the handover from the NR to the eNB connected to the 5GC. The handover type indicates whether the core network to which the target eNB is connected is the EPC or the 5GC. If it is the 5GC, the handover is an intra-system handover. If it is the EPC, the handover is an inter-system handover.

In operation 503a, the AMF transmits a session management SM Context Request message to the SMF. Based on the information received in the handover required message, the AMF knows that the handover is an inter-system handover, and the AMF requests the SMF to provide the SM context. The AMF may also request an EPS bearer context. The AMF transmits the message to each SMF serving the UE.

In operation 503b, the SMF transmits an SM Context Response message to the AMF. The message contains the SM context of the UE. The SM context also contains the mapped EPS bearer context such as the EPS bearer identity and/or the EPS QoS information. If there is mapped EPS bearer context when the AMF requests the SM context, the SMF always feeds back the mapped EPS bearer context to AMF at the same time. Alternatively, the AMF further requests the mapped EPS bearer context when requesting the SM context from the SMF. The SMF transmits the mapped EPS bearer context only when the AMF simultaneously requests the mapped EPS bearer context. The AMF knows that the handover is an inter-system handover according to the information received from the source NG-RAN that there is no connection between the eNB and the 5G core network, or the information that the handover is an inter-system handover or the handover is a handover from the NR to the eNB connected to the EPC, and the AMF requests the SMF to provide mapped EPS bearer context information.

In the method of the disclosure, operation 503a and operation 503b may not be performed. The AMF obtains the EPS bearer information in the PDU session, such as the EPS bearer identity and the EPS QoS information, from the handover required message received from the NG-RAN, so that the AMF may compose the relocation request message of operation 504.

In operation 504, the AMF transmits a relocation request message to the MME. The AMF selects and finds the MME according to the identification information of the MME connected to the target eNB contained in the handover required message. The identification information of the MME to which the target eNB is connected may be TAI. The message contains the identity of the target eNB, a source-to-target transparent transmitter, and mapped EPS UE context information. The mapped EPS UE context information contains UE mobility management (MM) context information and session SM context information.

The AMF or the MME decides whether the data forwarding is feasible. Data forwarding here refers to indirect data forwarding. If the decision is made by the AMF and indicates that the indirect data forwarding is not feasible, the AMF informs the MME of this information.

The AMF informs the MME of information of the QoS flow contained in the PDU session.

In operation 505, the MME transmits a session create request message to the SGW. The message contains the EPS bearer context information.

In operation 506, the SGW transmits a session create response message to the MME. The message contains the tunnel information of the S1 interface for uplink data transmission allocated by the SGW.

In operation 507, the MME transmits a handover request message to the E-UTRAN. The message contains a source-to-target transparent transport and an E-RAB context. The E-RAB context includes the E-RAB to be established and the uplink tunnel information of the S1 interface allocated by the SGW. The E-RAB context contains information on whether data forwarding is feasible. The message contains the type of handover, the specific content of which is the same as that in operation 502, and details will not be described herein again.

In operation 508, the E-UTRAN transmits a handover request acknowledgement message to the MME. The message contains the list of established E-RABs, the list of E-RABs that are not successfully established, and the destination-to-source transparent transmitter. Corresponding to the established RAB, it also contains tunnel information for downlink data transmission of the S1 interface. Corresponding to the established E-RAB, if the source base station proposes a downlink data forwarding, the data forwarding is feasible, and the target eNB accepts the downlink data forwarding, it includes, by the target base station, tunnel information for S1 interface data forwarding which is allocated by the E-UTRAN for each E-RAB for which the data forwarding is needed.

In operation 509, the MME requests the SGW to create an indirect data forwarding tunnel. This step is performed only when indirect data forwarding needs to be performed. If the MME receives the S1 interface downlink tunnel information for data forwarding from the E-UTRAN, the MME requests the SGW to create an indirect data forwarding tunnel. The MME transmits the transport layer address and the TEID allocated by the eNB for data forwarding to the SGW. The transport layer address and the TEID are for each E-RAB.

The SGW transmits an indirect data forwarding tunnel creation response message to the MME. The message contains information allocated by the SGW for data forwarding between the SGW and the UPF. The information for data forwarding between the SGW and the UPF includes a PDU session identity and/or the E-RAB information contained in the PDU session. The E-RAB information contains an E-RAB identity and the tunnel information used by the E-RAB for data forwarding. The tunnel information contains the transport layer address and the TEID allocated by the SGW. The SGW allocates downlink data forwarding tunnel information for the E-RAB which needs the downlink data forwarding. The SGW allocates uplink data forwarding tunnel information for the E-RAB which needs the uplink data forwarding. The data forwarding tunnel information contained in the E-RAB information may contain the uplink and/or downlink data forwarding tunnel information.

In operation 510, the MME transmits a relocation response message to the AMF. The message contains the tunnel information allocated by the SGW for data forwarding. The tunnel information is for each EPS bear in the PDU session. The message contains a destination-to-source transparent transmitter. The MME transmits the E-RAB information contained in the PDU session and the tunnel information for data forwarding allocated by the SGW to each E-RAB to the AMF.

The message contains information allocated by the SGW for data forwarding between the SGW and the UPF. The information for data forwarding between the SGW and the UPF includes a PDU session identity and/or the E-RAB information contained in the PDU session. The E-RAB information contains an E-RAB identity and the tunnel information used by the E-RAB for data forwarding. The information for data forwarding between the SGW and the UPF contains the tunnel information for data forwarding allocated by the SGW per E-RAB for each PDU session. The tunnel information for data forwarding may contains downlink and/or uplink data forwarding tunnel information.

The E-RAB information is transmitted directly to the AMF by the MME, and converted by the AMF.

In operation 511, the AMF requests the SMF to create a data forwarding tunnel. The AMF transmits an indirect data forwarding tunnel create request message to the SMF. The message contains information of the PDU session. The information of the PDU session contains a PDU session identity, information of the QoS flows contained in the PDU session, the number of EPS bearers for each PDU session in the EPS system for which the data forwarding is needed, the mapping between the QoS flow and the EPS bearer, the EPS bearer identity and/or the QoS information of the EPS bearer. The message contains information for data forwarding received from the MME.

In operation 512, the SMF transmits an N4 session modification message to the UPF. The message contains information of the PDU session. The information of the PDU session contains a PDU session identity, information of the QoS flows contained in the PDU session, the number of EPS bearers for each PDU session in the EPS system for which the data forwarding is needed, the mapping between the QoS flow and the EPS bearer, the EPS bearer identity and/or the QoS information of the EPS bearer. The message contains information for data forwarding received from the AMF.

The N4 session modification message includes EPS bearer information contained in the PDU session. The EPS bearer information contains an EPS bearer identity and the tunnel information of the EPS bearer for data forwarding. The SMF informs the UPF of the correspondence between the QoS flow and the EPS bearer in the PDU session. The UPF knows the QoS flow information of the PDU session in the 5G system. The UPF receives the EPS bearer information contained in the PDU session and the mapping relationship between the QoS flow and the EPS bearer from the SMF.

The UPF allocates tunnel information for data forwarding between the NG-RAN and UPF, and transmits it to the SMF. The UPF allocates tunnel information for each PDU session. The tunnel information includes a transport layer address and a TEID.

The UPF transmits the allocated tunnel information for data forwarding to the SMF. The SMF receives the N4 session modification response message from the UPF. The message contains the tunnel information allocated by the UPF for data forwarding between the NG-RAN and the UPF.

In operation 513, the SMF transmits an indirect data forwarding tunnel response message to the AMF. The message contains the tunnel information allocated by the UPF for data forwarding between the NG-RAN and the UPF.

In operation 514, the AMF transmits a handover command message to the NG-RAN. The message contains a destination-to-source transparent transmitter and the tunnel information allocated by the UPF for data forwarding. The message further contains information of established PDU sessions and information of PDU sessions that are not successfully established. The information of established PDU sessions contains information of established QoS flows and information of QoS flows that are not successfully established. The tunnel information for data forwarding is for each PDU session.

In operation 515, the NG-RAN transmits a handover command message to the UE.

The NG-RAN forwards data to the UPF. The NG-RAN forwards the data to the UPF on the corresponding tunnel for the PDU session for which the data forwarding is needed.

The NG-RAN transmits the data of each QoS flow for which the data forwarding is accepted to the UPF on the user plane tunnel allocated for the PDU session. For downlink data, the NG-RAN transmits downlink packets to the UPF on the tunnel allocated for downlink data forwarding.

The UPF forwards the data to the SGW. The UPF directly forwards the data received from the NG-RAN to the SGW via the user plane tunnel allocated for the corresponding EPS bearer. The SGW forwards the data directly to the target base station. The UPF forwards the data of different QoS flows in the PDU session to the SGW via the user plane tunnels allocated for corresponding EPS bearers according to the mapping relationship between the QoS flow and the EPS bearer. According to the mapping relationship between the QoS flow and the EPS bearer and the information of the EPS bearer for which the data forwarding is accepted, the UPF knows the QoS flow for which the data forwarding is accepted, and the UPF forwards the data of the QoS flow for which the data forwarding is accepted to the user plane tunnel allocated for the corresponding EPS bearer to forward it to the SGW. Corresponding to the QoS flow for which the data forwarding is not accepted, there is no corresponding data forwarding tunnel, and the UPF discards the data. The SGW directly forwards the data to the target base station.

The SGW forwards the data to the E-UTRAN. The SGW transmits the data, which is received from the UPF on the tunnel corresponding to each EPS bearer, to the E-UTRAN via the corresponding tunnel allocated by the E-UTRAN, that is, the UPF performs a mapping of multiple tunnels to one tunnel. The SGW forwards the data to the E-UTRAN according to the session transmission mode in the EPS.

During the PDU session establishment or guaranteed bit rage (GBR) QoS flow establishment process, the UE receives the EPS QoS information and/or EPS bearer identification information mapped to the QoS flow from the network. The UE associates the correspondence between the ongoing QoS flow and the EPS bearer identity contained in the handover command message. For the QoS flow without a corresponding EPS bearer, the UE may delete it.

In operation 516, the UE transmits a handover complete message to the E-UTRAN.

In operation 517, the E-UTRAN transmits a handover complete message to the MME. The message contains the tunnel information allocated by the E-UTRAN for downlink data transmission.

In operation 518, the MME transmits a bearer modification request message to the SGW. The message contains the tunnel information of the S1 interface for downlink data transmission.

In operation 519, the SGW transmits the bearer modification request message to the UPF (PGW-U).

The SMF may also have the function of the PGW control plane. The SGW allocates tunnel information for downlink data transmission between the SGW and the UPF, where the tunnel information corresponds to each EPS bearer or each PDU session.

In operation 520, the SMF requests a UPF session modification. The SMF may also have the function of the PGW control plane. The SMF transmits to the UPF the tunnel information for downlink data transmission between the SGW and the UPF allocated by the SGW, where the tunnel information corresponds to each EPS bearer or each PDU session. The UPF transmits a session modification response to the SMF. The UPF allocates tunnel information for uplink data transmission between the SGW and the UPF, and the UPF transmits the tunnel information for uplink data transmission to the SMF.

In operation 521, the SMF transmits a bearer modification response message to the SGW. The message contains the tunnel information allocated by the UPF for uplink data transmission between the SGW and the UPF.

In operation 522a, the UPF transmits an end marker to the source NG-RAN. The UPF starts to transmit downlink data to the SGW, and the SGW transmits the downlink data to the E-UTRAN.

In operation 522b, for the QoS flow for which the packet forwarding has been completed, the source base station transmits an end marker to the UPF via a tunnel of the PDU session where the QoS flow is located. The end marker packet contains the QFI of the QoS flow. The source base station does not need to wait until the packets of all the QoS flows of the PDU session are forwarded and then transmit the end marker on the corresponding tunnel. The source base station transmits an end marker individually after the data forwarding for each QoS flow has been completed, and the end marker packet contains a corresponding QFI. The source base station adds the QFI to the header of the end marker packet. Based on the correspondence between the QoS flow and the EPS bearer, the UPF removes the QFI from the corresponding end marker packet and transmits it to the SGW via a tunnel of the corresponding EPS bearer. If the packet header contains a reflected QoS indication (RQI), the UPF also removes the RQI before transmitting it to the SGW. According to the correspondence between the end marker and the EPS bearer, the UPF may transmit an end marker to the SGW via a tunnel of the corresponding EPS bearer after receiving the end markers of all QoS flows corresponding to the EPS bear from the source NG-RAN. The packet format of the end marker transmitted to the SGW is the same as that in the EPS system.

The target E-UTRAN first transmits the received forwarded data to the UE, and then transmits the data from the core network.

In operation 522c, the SGW transmits the received end marker to the E-UTRAN.

In operation 523, the SGW transmits a bearer modification response message to the MME.

Thus, the description about the second embodiment of method 1 of the disclosure has been completed. By using the method, it may start the transmission of the packets received from the core network as soon as possible, so as to reduce the packet transmission delay during the data forwarding and improve the user experience. Furthermore, the UPF is simple in its behaviors, and performs a consistent handling of the end marker transmission for intra-system handover and inter-system handover.

Figure 6A:
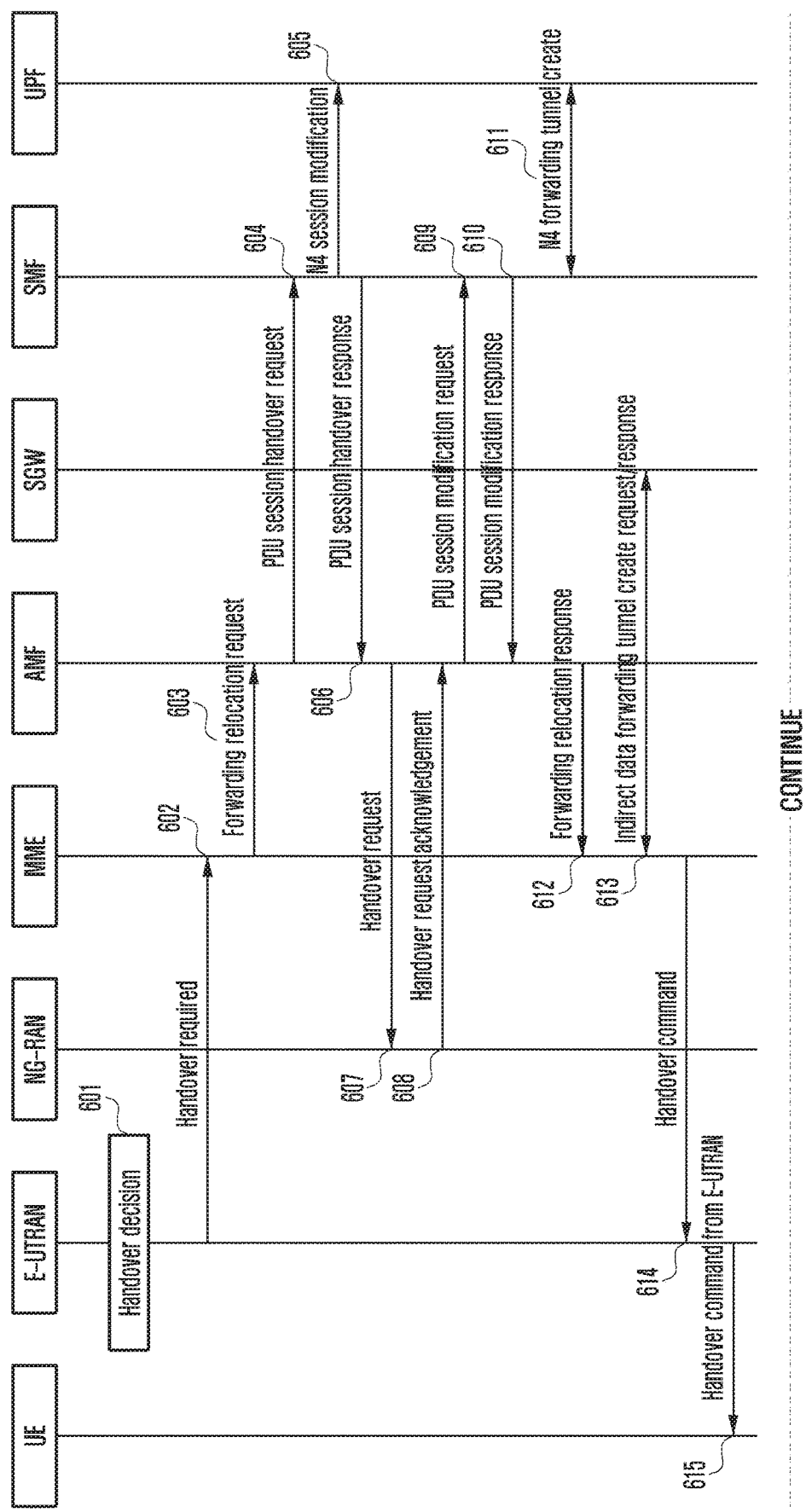
FIGS. 6A and 6B illustrate a handover supporting method 2 according to various embodiments of the disclosure.
Figure 6B:
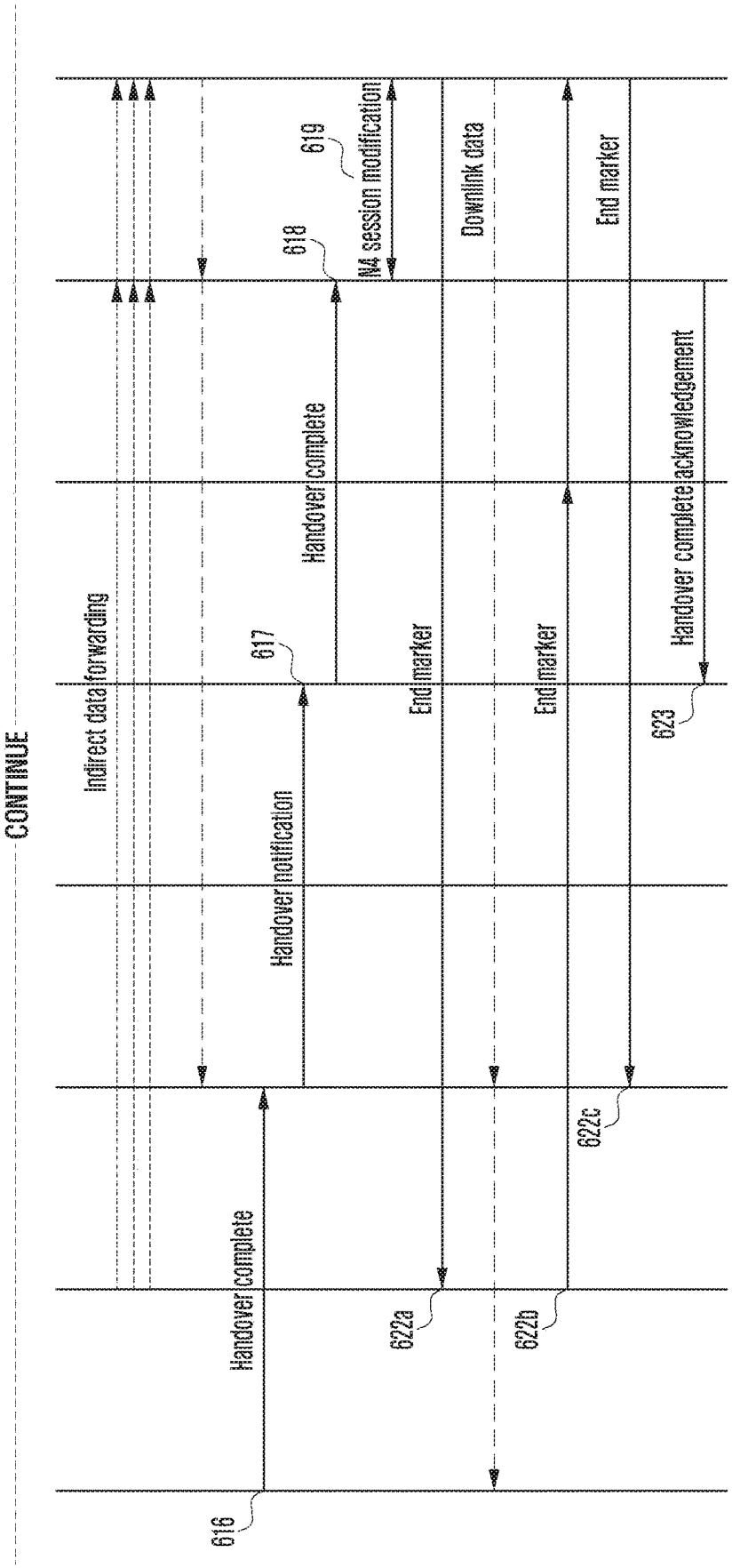

FIGS. 6A and 6B illustrate a handover supporting method 2 according to various embodiments of the disclosure.

The handover supporting method 2 of the disclosure is illustrated in FIGS. 6A and 6B. Detailed descriptions of the steps unrelated to the disclosure are omitted here. This embodiment includes steps of:

In operation 601, the NG-RAN decides to hand over the UE to the E-UTRAN.

The E-UTRAN here may be an eNB connected to the EPC. The NG-RAN may be a gNB, or a CU in an eNB or gNB connected to the 5GC. An eNB connected to the 5GC may also be referred to as a ng-eNB.

The user plane path before the handover may be an anchor UPF, the SGW and the E-UTRAN. The SGW needs to support the interface with the anchor UPF. The anchor UPF may be either in the 5GC or the EPC, or may be a common entity. The anchor UPF may be a UPF serving the UE, and performs the function of the user plane anchor in the inter-radio access technology (RAT) handover process. The anchor UPF may include the function of the PGW user plane plus the function of the UPF, or the function of the UPF plus the function of the PGW user plane, and performs the function of the user plane anchor in inter-RAT handover process.

In operation 602, the E-UTRAN transmits a handover required message to the MME. The message contains the identity of the target NG-RAN node and a source-to-target transparent transmitter. The message also contains identification information indicating the AMF to which the target NG-RAN node is connected. The identity information may be a tracking area identity or a network fragment identity or an AMF pool identity or an AMF identity, and the like.

The E-UTRAN proposes data forwarding for an E-RAB. The handover required message contains a list of E-RAB information of the UE. The E-RAB information contains an E-RAB identity and a downlink data forwarding proposed for the E-RAB. The list of E-RAB information of the UE here is directly contained in the handover required message or in the source-to-target transparent transmitter. If it is contained in the handover required message, the core network can know the downlink data forwarding information proposed for the E-RAB. For the inter-system handover (that is, the target base station is in the NG-RAN), the UE's E-RAB identity and downlink data forwarding are contained, by the E-UTRAN, in the handover required message or in the source-to-target transparent transmitter. For the handover within the LTE system, the UE's E-RAB identity and downlink data forwarding are contained, by the E-UTRAN, in the source-to-target transparent transmitter.

In operation 603, the MIME transmits a relocation request message to the AMF. The MME selects and finds the AMF according to the identification information of the AMF connected to the target NG-RAN node contained in the handover required message. The message contains the identity of the target NG-RAN node, a source-to-target transparent transmitter and the UE context information. The UE context information contains UE MM context information and session management context. The message contains the type of handover. The type of handover includes a handover within the LTE, a handover from the LTE to the NR, and the like. Corresponding to the handover from the LTE to the NR, the handover may further include a handover from the LTE base station connected to the EPC to the NR or a handover from the LTE base station connected to the 5GC to the NR. This is because the LTE base station eNB may and may not support an interface with the 5GC.

The message contains a list of EPS bearer information of the UE. The EPS bearer information contains an EPS bearer identity and the downlink data forwarding proposed for the EPS bearer.

The MME or the AMF decides whether the data forwarding is feasible. Data forwarding here refers to indirect data forwarding. If the decision is made by the MME and indicates that the indirect data forwarding is not feasible, the MME informs the AMF of this information.

In operation 604, the AMF transmits a PDU handover request message to a selected SMF. The message contains a PDN connection and an AMF identity. The PDN connection provides the public address of the SMF plus PGW control plane function. Based on the information received in a relocation request message, the AMF knows that the handover is an inter-system handover, and the AMF requests the SMF to provide the SM context. The AMF transmits the message to each SMF serving the UE.

The message contains a list of EPS bearer information of the UE. The EPS bearer information contains an EPS bearer identity and the downlink data forwarding proposed for the EPS bearer.

The SMF receives the EPS bearer identity and the downlink data forwarding proposed for the EPS bearer which were received from the MME previously, and, according to the PDU session identity and the QoS flow identity corresponding to the EPS bearer obtained in the PDU session or the EPS bearer establishment process, the SMF knows the PDU session and the QoS flow corresponding to the EPS bearer, thereby the SMF may know that the source base station proposes the downlink data forwarding for the PDU session and the QoS flow.

In operation 605, the SMF modifies the UPF.

In operation 606, the SMF transmits a PDU session handover response message to the AMF. The message contains a PDU session identity, an EPS bearer setup list, and a QoS rule.

The message further contains a mapping relationship between the EPS bearer and the QoS flow in the PDU session. If there is mapped EPS bearer context when the AMF requests the SM context, the SMF always feeds back the mapped EPS bearer context to AMF at the same time. Alternatively, the SMF transmits the mapped EPS bearer context only when the AMF simultaneously requests the mapped EPS bearer context.

In operation 607, the AMF transmits a handover request message to the NG-RAN. The message contains information of the PDU session to be established. The information of the PDU session to be established contains a PDU session identity, a downlink data forwarding of the session PDU, QoS information of the session, QoS flow information, downlink data forwarding proposal for the QoS flow, uplink tunnel information of each session, a source-to-target transparent transmitter, and/or QoS information of the QoS Flow. The message contains the type of handover. The type of handover includes a handover within the LTE, a handover from the LTE to the NR, and the like. Corresponding to the handover from the LTE to the NR, the handover may further include a handover from the LTE base station connected to the EPC to the NR or a handover from the LTE base station connected to the 5GC to the NR. This is because the LTE base station eNB may and may not support an interface with the 5GC.

The message contains a list of QoS information in the PDU session. The QoS information contains a QoS flow identity, QoS information of the QoS flow, and/or information of the proposed downlink data forwarding for the QoS flow.

The message may also contain a mapping relationship between the QoS flow and the EPS bearer in the PDU session, that is, the EPS bearer identity and/or the QoS information mapped to the QoS flow. The message contains a source-to-target transparent transmitter.

In operation 608, the NG-RAN transmits a handover request acknowledgement message to the AMF. The message contains one or more of the following:

A destination-to-source transparent transmitter. The destination-to-source transparent transmitter may further contain a mapping relationship between the QoS flow and the EPS bearer in the PDU session, that is, the EPS bearer identity and/or the QoS information mapped to the QoS flow. The destination-to-source transparent transmitter may also contain information of the successfully established PDU session. The information of the PDU session contains a PDU session identity and a list of identities of the successfully established QoS flows in the PDU session.

List of information of the PDU sessions for which the NG-RAN accepts their establishments. The list of information of the PDU sessions contains PDU session identities, downlink tunnel information used by the NG3 interface for the PDU sessions, information of the QoS flows accepted by the PDU session, information of the unaccepted QoS flows, and tunnel information used by the NG3 interface for data forwarding. For the QoS flow that is successfully established in the successfully established PDU session, if the 5G-RAN receives the proposed downlink data forwarding and accepts the data forwarding, the NG-RAN allocates the tunnel information for the corresponding PDU session, which is used by the NG3 interface for data forwarding. For the QoS flow that is successfully established, if the 5G-RAN receives the proposed downlink data forwarding, the data forwarding is feasible and the 5G-RAN accepts the data forwarding, the NG-RAN allocates the tunnel information for the corresponding PDU session, which is used by the NG3 interface for data forwarding. The information that the data forwarding for the QoS flow is accepted is contained, by the 5G-RAN, in the handover request acknowledgement message. For the QoS flow that is successfully established in the successfully established PDU session, if the 5G-RAN receives the downlink data forwarding proposed for a mapped E-RAB and the NG-RAN accepts the data forwarding for the QoS flow, the NG-RAN allocates the tunnel information for the corresponding PDU session, which is used by the NG3 interface for data forwarding. For the QoS flow that is successfully established, if the 5G-RAN receives the downlink data forwarding proposed for a mapped E-RAB, the data forwarding is feasible and the NG-RAN accepts the data forwarding for the QoS flow, the NG-RAN allocates the tunnel information for the corresponding PDU session, which is used by the NG3 interface for data forwarding. The information that the data forwarding for the QoS flow is accepted is contained, by the 5G-RAN, in the handover request acknowledgement message. The tunnel information for data forwarding is for each PDU session.

List of information of the PDU sessions for which the NG-RAN does not accept their establishments. The list of information of the PDU sessions contains PDU session identities and the reason for not accepting.

In operation 609, the AMF transmits a PDU session modification request message to the SMF. If the tunnel information used by the NG3 interface for data forwarding is received from the NG-RAN, the AMF requests the SMF to create a data forwarding tunnel. The AMF transmits the tunnel information received from the NG-RAN for data forwarding to the SMF. The message contains the PDU session to which the EPS bearer belongs. The message may also contain a mapping relationship between the EPS bearer and the QoS flow in the PDU session. The message contains information that the NG-RAN of the QoS flow target has accepted the data forwarding.

According to the mapping relationship between the EPS bearer and the PDU session identity and the QoS flow identity, the SMF knows the information of the EPS bearer for which the data forwarding is accepted.

The SMF allocates tunnel information for the EPS bearer for which the data forwarding is accepted, or the SMF requests the UPF to allocate the data forwarding tunnel information for the EPS bearer for which the data forwarding is accepted. Alternatively, the SMF allocates tunnel information for the PDU session for which the data forwarding is accepted, or the SMF requests the UPF to allocate the data forwarding tunnel information for the PDU session for which the data forwarding is accepted.

The message contains information of the successfully established QoS flow and/or information of the QoS flow which is not successfully established. Alternatively, the message contains information of the successfully established QoS flow, the SMF know the information of the QoS flow which is not successfully established according to the information of the QoS flows in the PDU session of the UE and the information of the successfully established QoS flow.

In operation 610, the SMF transmits a PDU session modification response message to the AMF. The message contains tunnel information allocated by the SMF or the anchor UPF for data forwarding between the SGW and the anchor UPF. The message contains a destination-to-source transparent transmitter.

The message contains a list of established EPS bearers. The SMF obtains a list of established EPS bearers which are successfully handed over to the target base station according to the information of the successfully established QoS flow. The message further contains tunnel information allocated for the EPS bearer for which the data forwarding is accepted or tunnel information allocated for the PDU session for which the data forwarding is accepted.

The message contains the QoS flow information to be mapped to the PDU session in the 5GS system. The QoS flow information includes QoS information corresponding to the flow identity and/or the flow.

In operation 611, the SMF transmits the NG3 interface downlink data forwarding tunnel information, which is allocated by the NG-RAN, to the anchor UPF by using a N4 session establishment process or a N4 session modification process. The SMF allocates data forwarding tunnel information between the SGW and the UPF. Alternatively, the anchor UPF allocates tunnel information for data forwarding between the SGW and the anchor UPF, and transmits it to the SMF. The N4 session establishment message or the N4 session modification message contains the PDU session to which the EPS bearer belongs. The N4 session establishment message or the N4 session modification message may also contain a mapping relationship between the EPS bearer and the QoS flow in the PDU session.

The SMF transmits the tunnel information allocated by the SMF or the UPF for data forwarding between the SGW and the anchor UPF to the AMF. The tunnel information is for the EPS bearer or PDU session for which the data forwarding is accepted.

The message contains information of the successfully established QoS flow and/or information of the QoS flow which is not successfully established. Alternatively, the message contains information of the successfully established QoS flow, the SMF know the information of the QoS flow which is not successfully established according to the information of the QoS flows in the PDU session of the UE and the information of the successfully established QoS flow.

The PDU session modification response message of operation 610 may be performed before or after the N4 session establishment response message or the N4 session modification response message of operation 611.

There are three methods for data forwarding between the SGW and the anchor UPF:

Method 1: the data transmission between the SGW and the anchor UPF is: one tunnel per EPS bearer for each PDU session. The anchor UPF transmits data belonging to the same PDU session, which is received from SGW corresponding to the tunnel of each EPS bearer, to the NG-RAN via the same tunnel, that is, the anchor UPF performs a mapping of multiple tunnels to one tunnel. The anchor UPF needs to add the QoS flow identity in the packet header, and transmits it to the NG-RAN. Corresponding to this data forwarding method, the anchor UPF or the SMF allocates tunnel information for data forwarding between the SGW and the anchor UPF for each EPS bearer in each PDU session for which the data forwarding is needed. For each PDU session, the number of EPS bearers is same as the number of data forwarding tunnels. The anchor UPF knows the number of EPS bearers for which the data forwarding is needed at the EPS side for each PDU session, according to the information received in operations 609 and 611 from the AMF. The anchor UPF or the SMF transmits the tunnel information for data forwarding allocated for each EPS bearer in the PDU session to the AMF.

Method 2: the data transmission between the SGW and the anchor UPF is: one tunnel for each PDU session. The SGW transmits data belonging to the same PDU session, which is received from SGW corresponding to the tunnel of each EPS bearer, to the anchor UPF via the same tunnel. Corresponding to this data forwarding method, the anchor UPF allocates tunnel information for data forwarding between the SGW and the anchor UPF for each PDU session.

Method 3: the data transmission between the SGW and the anchor UPF is: one tunnel for each PDU session. The SGW transmits data belonging to the same PDU session, which is received from SGW corresponding to the tunnel of each E-RAB, to the anchor UPF via the same channel, and adds QoS and/or flow related information to the header of the packet. Corresponding to this data forwarding method, the anchor UPF allocates tunnel information for data forwarding between the SGW and the anchor UPF for each PDU session. In the response message of operation 609 and operation 611, the anchor UPF transmits the QoS flow information to be mapped to the PDU session in the 5GS system to the AMF. The QoS flow information includes QoS information corresponding to the flow identity and/or the flow. The AMF informs the MME of the information via operation 610, and the MME informs the SGW of the information via operation 613. The QoS and/or flow related information may be contained by the SGW in the packet header.

The anchor UPF transmits the allocated tunnel information for data forwarding to the AMF via the SMF.

In operation 612, the AMF transmits a forwarding relocation response message to the MME. The message contains a destination-to-source transparent transmitter and an EPS bear to be setup list. The message further contains tunnel information allocated for the EPS bearer for which the data forwarding is accepted.

In operation 613, the MME transmits an indirect data forwarding tunnel request message to the SGW. The message contains tunnel information for data forwarding between the SGW and the anchor UPF.

Corresponding to the data forwarding method 3, the message contains the QoS flow information to be mapped to the EPS bearer in the PDU session in the 5GS system, and is transmitted to the SGW. The QoS flow information includes QoS information corresponding to the flow identity and/or the flow.

The SGW transmits an indirect data forwarding tunnel creation response message to the MME. The message contains the uplink tunnel information allocated by the SGW for S1 interface data forwarding.

In operation 614, the MME transmits a handover command message to the E-UTRAN. The message contains a destination-to-source transparent transmitter and the tunnel information used by the S1 interface for data forwarding. The message contains the type of handover. The tunnel information used by the S1 interface for data forwarding is for the E-RAB. The presence of the tunnel information of data forwarding indicates that the target base station has accepted the data forwarding. The type of handover includes a handover within the LTE, a handover from the LTE to the NR, and the like. Corresponding to the handover from the LTE to the NR, the handover may further include a handover from the LTE base station connected to the EPC to the NR or a handover from the LTE base station connected to the 5GC to the NR. This is because the LTE base station eNB may and may not support an interface with the 5GC.

In operation 615, the E-UTRAN transmits a handover command message from the E-UTRAN to the UE.

The message may also contain a mapping relationship between the QoS flow and the EPS bearer in the PDU session, that is, the EPS bearer identity and/or the QoS information mapped to the QoS flow.

The E-UTRAN forwards the data to the SGW. For each E-RAB for which the data forwarding is needed, the E-UTRAN forwards data to the SGW on the corresponding tunnel.

The SGW forwards the data to the anchor UPF. The SGW has different behaviors corresponding to the three data methods described in operation 611.

Method 1: For each EPS bearer for which the data forwarding is needed, the SGW forwards data to the anchor UPF on the corresponding tunnel.

Method 2: The SGW transmits data belonging to the same PDU session, which is received from SGW corresponding to the tunnel of each EPS bearer, to the anchor UPF via the same tunnel. The anchor UPF performs the mapping of the PDU session to the QoS flow.

Method 3: The SGW transmits data belonging to the same PDU session, which is received from SGW corresponding to the tunnel of each E-RAB, to the anchor UPF via the same channel, and adds QoS and/or flow related information to the header of the packet. The SGW performs the mapping of the PDU session to the QoS flow. The SGW performs the mapping of the PDU session to the QoS flow according to the information received in operation 613.

The anchor UPF forwards the data to the NG-RAN. The anchor UPF has different behaviors corresponding to the three data methods described in operation 611.

Method 1: The anchor UPF transmits data belonging to the same PDU session, which is received from SGW corresponding to the tunnel of each EPS bearer, to the NG-RAN via the same tunnel, that is, the anchor UPF performs a mapping of multiple tunnels to one tunnel. The anchor UPF forward the data to the NG-RAN following the session transmission method in the 5GS, for example, how many QoS flows are used for each PDU session to transmit the downlink data, how to configure the header of the QoS flow (e.g., information such as the QoS flow identity contained in the header of the packet), and the like. For the QoS flow, that is not successfully established, received in operation 611, if the anchor UPF receives the data forwarded from the SGW, the anchor UPF discards the data. This is because the access control in the NG-RAN is performed on the basis of the QoS flow, while at the E-UTRAN side, the data tunnel is for each E-RAB, and the data forwarding is also in E-RAB level. The QoS flow level is finer than the E-RAB level. The E-URAN cannot distinguish data of different QoS flows, or the E-UTRAN does not know the information of the QoS flow that is not successfully established, then the E-UTRAN may also forward the data of the QoS flow that is not successfully established in E-RAB to SGW, which transmits the data to the anchor UPF. The UPF discards the data of the QoS flow that is not successfully established.

Method 2: The anchor UPF receives data directly from the SGW corresponding to the tunnel of each PDU session. The anchor UPF forward the data to the NG-RAN following the session transmission method in the 5GS, for example, how many flows are used for each PDU session to transmit the downlink data, how to configure the header of the flow, and the like.

Method 3: The anchor UPF receives the data that needs to be forwarded in the 5GS system directly from the SGW. The anchor UPF forwards the data to the NG-RAN.

During the PDU session establishment process or the EPS bearer establishment process, the UE receives the QoS information and/or the QoS flow information of the QoS flow mapped to the EPS bearer from the network. The UE associates the correspondence between the ongoing EPS bearer and the QoS flow contained in the handover command message. For the EPS bearer without a corresponding QoS flow, the UE may delete it.

Alternatively, the UE obtains the mapping relationship between the QoS flow and the EPS bearer in the PDU session from the handover command message. The UE associates the correspondence between the ongoing EPS bearer and the QoS flow contained in the handover command message. For the EPS bearer without a corresponding QoS flow, the UE may delete it.

In operation 616, the UE transmits a handover complete message to the NG-RAN.

In operation 617, the NG-RAN transmits a handover notification message to the AMF. The message contains the tunnel information allocated by the NG-RAN for downlink data transmission.

In operation 618, the AMF transmits a handover complete message to the SMF.

In operation 619, the SMF transmits an N4 session modification message to the UPF. The UPF transmits an N4 session modification response message to the SMF. The AMF transmits the tunnel information allocated by the NG-RAN for downlink data transmission to the anchor UPF via the SMF.

Operation 622a, for each EPS bearer, the UPF sends one or several end marker packet(s) to the SGW on the corresponding EPS bearer tunnel, and the SGW transmits the received end marker packet(s) to the source E-UTRAN on a tunnel of corresponding EPS bearer. The UPF starts to transmit downlink data to the NG-RAN. The EPS bearer and the E-RAB are in a one-to-one relationship, i.e. an EPS bearer in the core network and an E-RAB in the access network.

Operation 622b, for each E-RAB, after completing the data packets forwarding, the source E-UTRAN forwards the end marker packets to the SGW.

In operation 622c, the SGW transmits the received end marker packets to the UPF.

The UPF adds a QFI to the end marker packet based on the mapping of a QoS flow and an EPS bearer and sends the end marker packet to the NG-RAN via the PDU session tunnel. If one EPS bearer corresponds to multiple QoS flows, the UPF may transmit one or several end markers to the NG-RAN for each QoS flow, where the end marker packet header contains a QFI. The UPF may add one QFI among the QoS flows mapped to the EPS bearer to the end marker packet.

For each QoS flow in the PDU session, after the NG-RAN completes the transmission of the forwarded data packets from the source base station in the buffer and receives a corresponding end marker packet, the NG-RAN starts to transmit the packet(s) received from the core network to the UE. Corresponding to the method that the UPF sends one or several end marker packet(s) for each QoS flow to the NG-RAN, the target NG-RAN starts to transmit the data packets of the QoS flow received from the core network towards the UE when the target NG-RAN receives the end marker packet of the QoS flow. Corresponding to the method that the UPF adds a QFI of one QoS flow mapped to the EPS bearer to the end marker packet, the target NG-RAN knows that data forwarding for all the QoS flows mapped to the same E-RAB to which the QoS flow indicated by the QFI mapped is completed. The target NG-RAN starts to transmit the data packets of all QoS flows mapped to the corresponding E-RAB received from the core network towards the UE.

In operation 623, the SMF transmits a session handover complete acknowledgment message to the AMF.

The session modification response message of operation 623 may be performed before or after the N4 session modification response message of operation 619.

Thus, the description about method 2 of the disclosure has been completed. By using the method, the target base station can start the transmission of the packets received from the core network as soon as possible, so as to reduce the packet transmission delay during the data forwarding and improve the user experience. Furthermore, the UPF is simple in its behaviors, and performs a consistent handling of the end marker transmission for intra-system handover and inter-system handover, avoiding additional modifications to the UPF.

Figure 7:
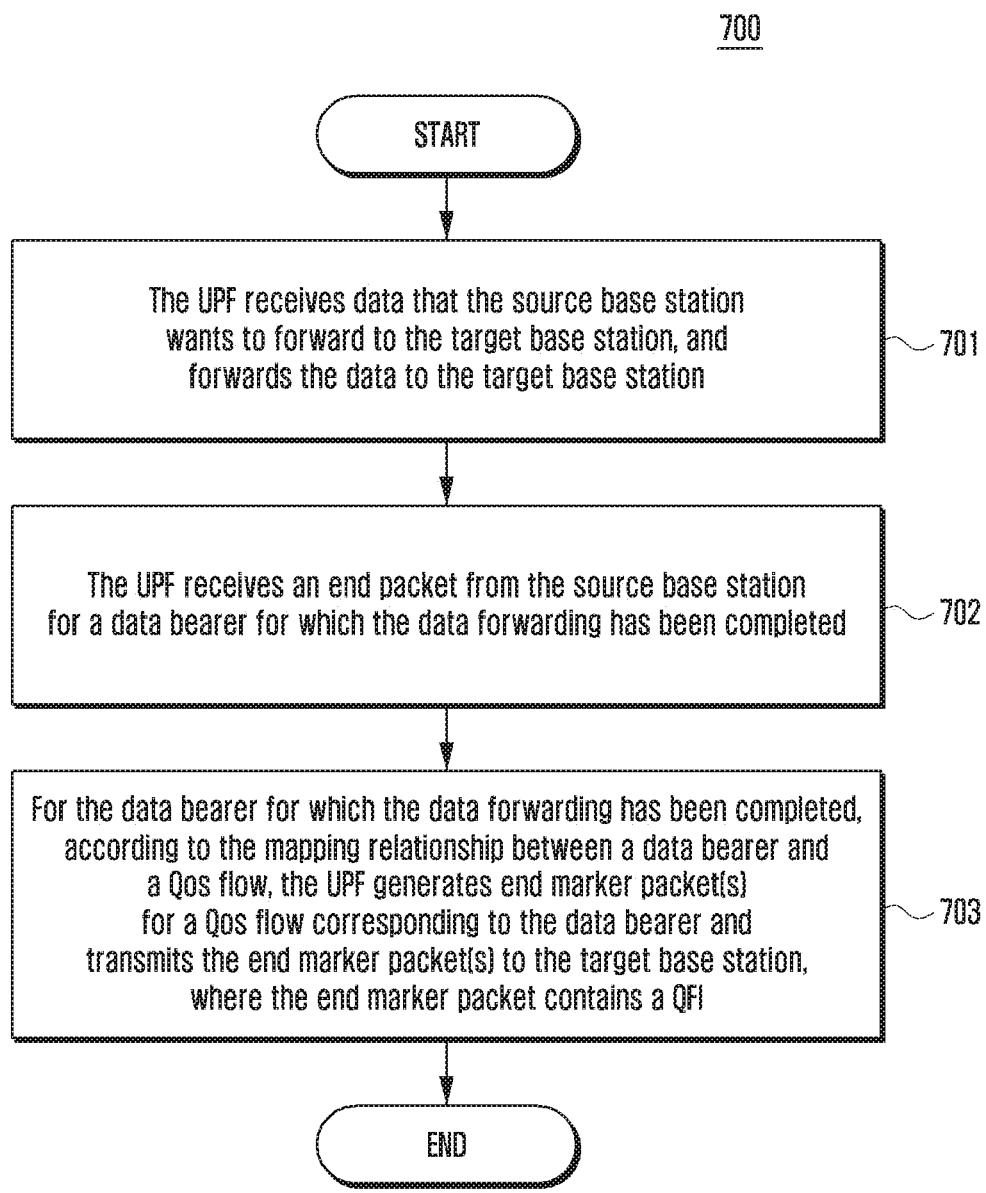
FIG. 7 illustrates the operation at a core network node user plane function (UPF) in the handover supporting method 2 according to an embodiment of the disclosure.

FIG. 7 illustrates the operation 700 at a core network node UPF in the handover supporting method 2 according to an embodiment of the disclosure. The operation 700 includes the following steps:

In operation 701, the UPF receives, via the SGW, data that the source base station wants to forward to the target base station, and forwards the data to the target base station. The forwarded data includes fresh data that has not been transmitted to the UE and/or data that the UE has not acknowledged.

In operation 702, the UPF receives an end packet from the source base station for a data bearer for which the data forwarding has been completed.

In operation 703, for the data bearer for which the data forwarding has been completed, according to the mapping relationship between a data bearer and a QoS flow, the UPF generates end marker packet(s) for a QoS flow corresponding to the data bearer and transmits the end marker packet(s) to the target base station, where the end marker packet contains a QFI. If one EPS bearer corresponds to multiple QoS flows, the UPF may transmit one or several end markers to the NG-RAN for each QoS flow, where the end marker packet header contains a QFI.

At this point, the description of the operation of method 2 of the disclosure at the UPF has been completed.

Figure 8:
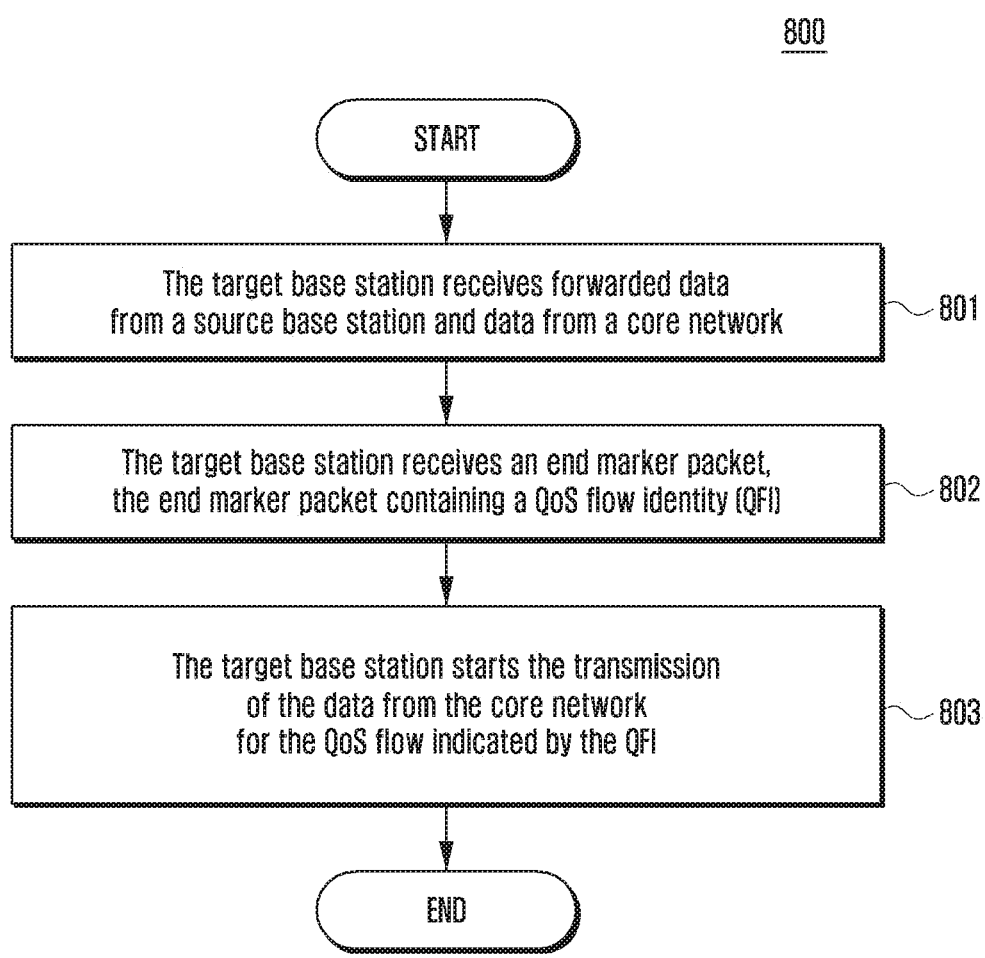
FIG. 8 illustrates the operation at a target base station in the handover supporting method 2 according to an embodiment of the disclosure.

FIG. 8 illustrates the operation 800 at a target base station in the handover supporting method 2 according to an embodiment of the disclosure. The operation 800 includes the following steps:

In operation 801, the target base station receives forwarded data from a source base station and data from a core network. The data forwarding may be a direct data forwarding between the source base station and the target base station, or may be an indirect data forwarding via the core network. The data forwarded by the source base station to the target base station includes fresh data that has not been transmitted to the UE and/or data that the UE has not acknowledged.

In operation 802, the target base station receives an end marker packet, the end marker packet containing a QFI. The end marker packet may be received from the source base station (e.g., in the case of inter-base station handover within the same system), or may be received from the core network.

In operation 803, the target base station starts the transmission of the data from the core network for the QoS flow indicated by the QFI.

At this point, the description of the operation of method 2 of the disclosure at the target base station has been completed.

FIG. 9 illustrates a handover supporting method 3 according to an embodiment of the disclosure.

The handover supporting method 3 of the disclosure is illustrated in FIG. 9. The method includes steps of:

In operation 901, the source base station forwards data to the target base station. The data forwarding may be direct data forwarding between the source base station and the target base station or indirect data forwarding via the core network. The source base station forwards fresh data that has not been transmitted to the UE to the target base station. The source base station may forward fresh data that has not been transmitted to the UE to the target base station through a tunnel for a PDU session. The fresh data that has not been transmitted to the UE is a SDAP SDU. The source base station transmits data that the UE has not acknowledged via a tunnel of a DRB, where the data that the UE has not acknowledged contains a PDCP PDU and/or a PDCP SDU.

In operation 902, the source base station receives an end marker packet from the core network. Corresponding to each QoS flow in the PDU session, the UPF transmits one or more end markers. The end marker contains the QFI of the corresponding QoS flow.

In operation 903, data of multiple QoS flows in one PDU session is transmitted on the tunnel of this PDU session. For the QoS flow for which the packet forwarding has been completed, the source base station transmits an end marker to the target base station via a tunnel of the PDU session where the QoS flow is located. The end marker packet contains the QFI of the QoS flow. The source base station does not need to wait until the packets of all the QoS flows of the PDU session are forwarded and then transmit the end marker on the corresponding tunnel. The source base station transmits an end marker individually after the data forwarding for each QoS flow has been completed, and the end marker packet contains a corresponding QFI. For fresh data, i.e. data forwarding on the tunnel for each PDU session, as described above, the source base station transmits an end marker for the QoS flow. Regarding data forwarding on the DRB, when there is no data available for forwarding on the tunnel of the DRB and an end marker packet for the PDU session is received from the core network, the source base station transmits, on the tunnel of the DRB, one or more GTP-U end marker packets to the target base station, where the end marker packets do not contain the QFI.

The target base station first transmits the packets forwarded from the source base station to the UE. The target base station receives the end marker packet from the source base station, and, according to the QFI in the header, the target base station starts to transmit the data received by the QoS flow from the core network to the UE after the target base station completes the transmission of the packets forwarded from the source base station. For the QoS flow for which no end marker packet was received, the target base station then transmits the forwarded data received from the source base station or waits for the data forwarded from the source base station or the end marker, and starts to transmit packets received from the core network until it receives a corresponding end marker from the source base station.

At this point, the description of the handover supporting method 3 of the disclosure is completed. By using the method, the source base station transmits an end marker packet for each QoS flow in the PDU session, the target base station can know that the data forwarding of each QoS flow ends, and then start to transmit the packet received from the core network as soon as possible, thereby reducing the packet transmission delay in the data forwarding, and improving the user experience.

Figure 10A:
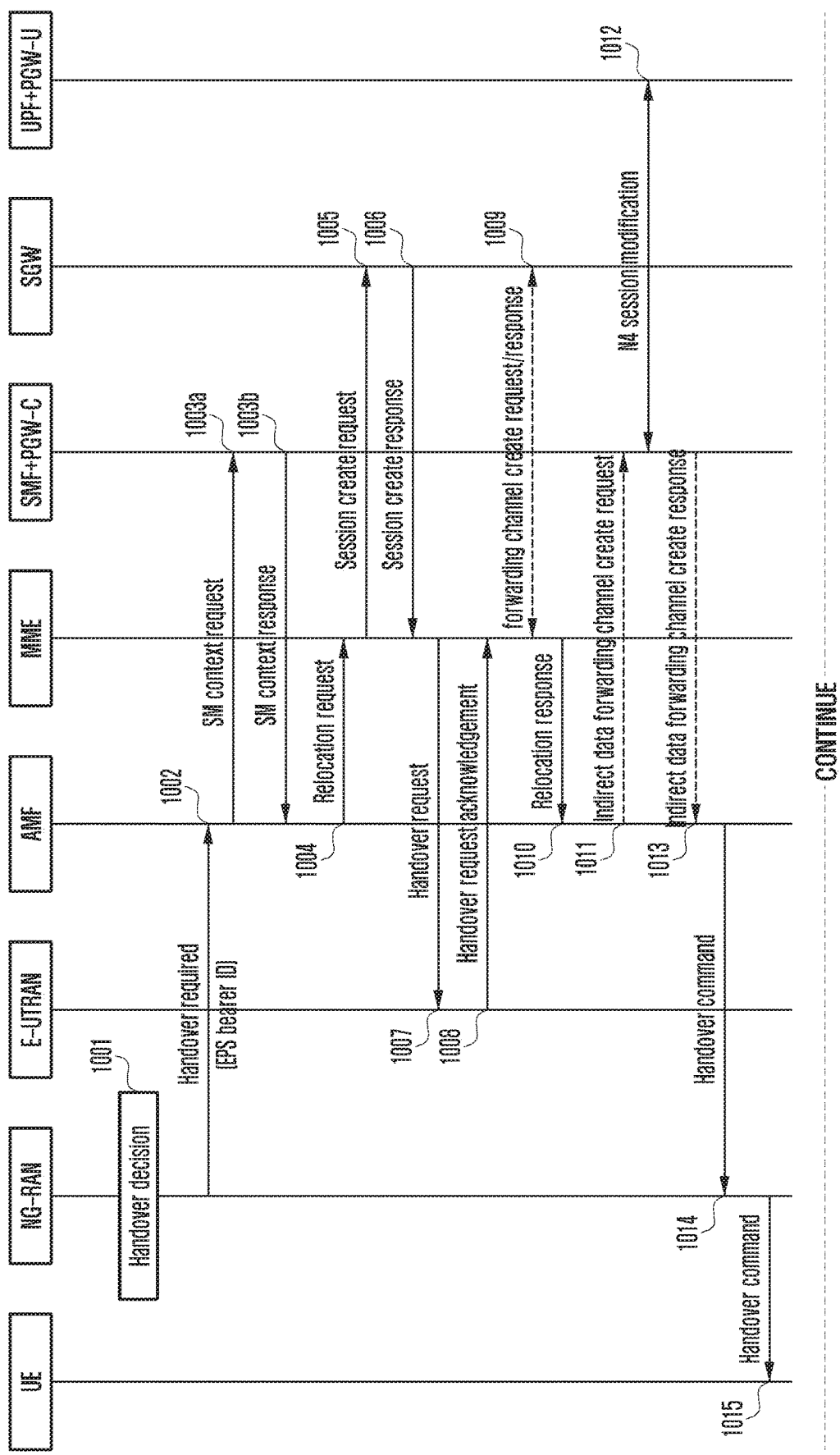
FIGS. 10A and 10B illustrate a handover supporting method 4 of the disclosure, for the handover from the 5GS to the EPS according to various embodiments of the disclosure.
Figure 10B:
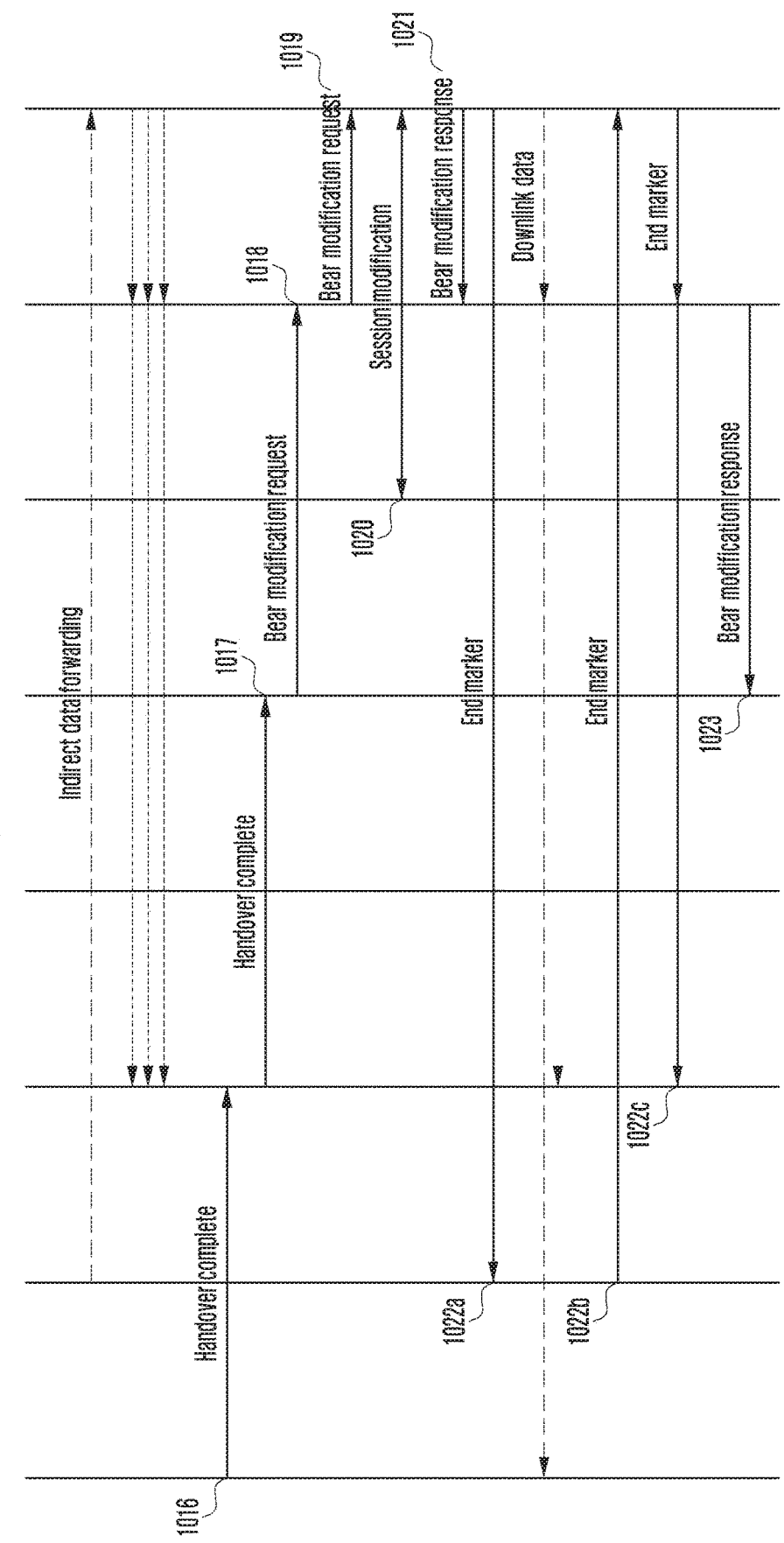

FIGS. 10A and 10B illustrate a handover supporting method 4 of the disclosure, for the handover from the 5GS to the EPS according to various embodiments of the disclosure.

An illustration of the handover supporting method 4 of the disclosure, for the handover from the 5GS to the EPS, is illustrated in FIGS. 10A and 10B. Detailed descriptions of the steps unrelated to the disclosure are omitted here. This embodiment includes steps of:

In operation 1001, the NG-RAN decides to hand over the UE to the E-UTRAN.

The E-UTRAN here may be an eNB connected to the EPC. The NG-RAN may be a gNB, or a CU in an eNB or gNB connected to the 5GC.

The user plane path before handover is UPF to NG-RAN. The SGW needs to support the interface with UPF. The UPF may contain the function of the PGW user plane to perform the function of the user plane anchor during different inter-RAT handovers.

In operation 1002, the NG-RAN transmits a handover required message to the AMF. The message contains the identity of the target eNB and a source-to-target transparent transmitter. The source-to-target transparent transmitter contains an E-RAB identity and a downlink data forwarding proposed for the E-RAB. The NG-RAN obtains an EPS bearer identity mapped to the QoS flow in the PDU session by the PDU session establishment process or the handover process. It is also possible to obtain mapped EPS QoS information. The NG-RAN decides whether to propose the data forwarding according to the mapping of the QoS flow to the E-RAB and the QoS information. The NG-RAN may consider other factors (such as whether there is data in the buffer) to make the decision without affecting the main content of the disclosure.

The handover required message may further contain a list of EPS bearer information. The EPS bearer information contains an EPS bearer identity and QoS information of the EPS bearer.

The message further contains identification information indicating the MME to which the target eNB is connected. The identification information may be a tracking area identity or an MME identity.

The NG-RAN informs the AMF of the type of handover. The type of handover comprise that the handover is an intra-NR handover, a handover from the NR to the LTE, a handover from the NR to the UTRAN, or a handover from the NR to the GERAN and/or GSM. Corresponding to the handover from the NR to the LTE, the NG-RAN informs the AMF whether the target base station of the handover is a base station connected to the 5G core network or the handover is a handover between different systems. This is because the LTE base station eNB may and may not support an interface with the 5GC. If the target base station is also connected to the 5GC, it is a handover within the 5G system. If the target base station is not connected to the 5GC but to the EPC, it is a handover between different systems. The NG-RAN may inform the AMF that the handover is a handover between different systems by including, in the handover required message, the information of the inter-system handover or the information that the target base station has no interface with the 5GC. If the identity length of the eNB connected to the 5GC is different from that of the eNB without connection to the 5GC, the 5GC may determine whether the handover is an inter-system handover according to the length of the target base station identity contained in the received handover required message. If the identity information of the MME connected to the target base station is different from the identity definition of the AMF node (for example, different in length), the 5GC may determine whether the handover is an inter-system handover according to the length of the core network identity connected to the target base station contained in the received handover required message. Alternatively, the NG-RAN informs the AMF of the handover type by directly setting the handover type in the handover required message as the handover from the NR to the eNB connected to the EPC or the handover from the NR to the eNB connected to the 5GC. The handover type indicates whether the core network to which the target eNB is connected is the EPC or the 5GC. If it is the 5GC, the handover is an intra-system handover. If it is the EPC, the handover is an inter-system handover.

In operation 1003a, the AMF transmits a session management SM Context Request message to the SMF. Based on the information received in the handover required message, the AMF knows that the handover is an inter-system handover, and the AMF requests the SMF to provide the SM context. The AMF may also request an EPS bearer context. The AMF transmits the message to each SMF serving the UE.

In operation 1003b, the SMF transmits an SM Context Response message to the AMF. The message contains the SM context of the UE. The SM context also contains the mapped EPS bearer context such as the EPS bearer identity and/or the EPS QoS information. If there is mapped EPS bearer context when the AMF requests the SM context, the SMF always feeds back the mapped EPS bearer context to AMF at the same time. Alternatively, the AMF further requests the mapped EPS bearer context when requesting the SM context from the SMF. The SMF transmits the mapped EPS bearer context only when the AMF simultaneously requests the mapped EPS bearer context. The AMF knows that the handover is an inter-system handover according to the information received from the source NG-RAN that there is no connection between the eNB and the 5G core network, or the information that the handover is an inter-system handover or the handover is a handover from the NR to the eNB connected to the EPC, and the AMF requests the SMF to provide mapped EPS bearer context information.

In the method of the disclosure, operation 1003a and operation 1003b may not be performed. The AMF obtains the EPS bearer information in the PDU session, such as the EPS bearer identity and the EPS QoS information, from the handover required message received from the NG-RAN, so that the AMF may compose the relocation request message of operation 1004.

In operation 1004, the AMF transmits a relocation request message to the MME. The AMF selects and finds the MME according to the identification information of the MME connected to the target eNB contained in the handover required message. The identification information of the MME to which the target eNB is connected may be TAI. The message contains the identity of the message contains the identity of the target eNB, a source-to-target transparent transmitter, and mapped EPS UE context information. The mapped EPS UE context information contains UE MM context information and session SM context information.

The AMF or the MME decides whether the data forwarding is feasible. Data forwarding here refers to indirect data forwarding. If the decision is made by the AMF and indicates that the indirect data forwarding is not feasible, the AMF informs the MME of this information.

The AMF informs the MME of information of the QoS flow contained in the PDU session.

In operation 1005, the MME transmits a session create request message to the SGW. The message contains the EPS bearer context information.

In operation 1006, the SGW transmits a session create response message to the MME. The message contains the tunnel information of the S1 interface for uplink data transmission allocated by the SGW.

In operation 1007, the MME transmits a handover request message to the E-UTRAN. The message contains a source-to-target transparent transport and an E-EAB context. The E-RAB context includes the E-RAB to be established and the uplink tunnel information of the S1 interface allocated by the SGW. The E-RAB context contains information on whether data forwarding is feasible. The message contains the type of handover, the specific content of which is the same as that in operation 1002, and details will not be described herein again.

In operation 1008, the E-UTRAN transmits a handover request acknowledgement message to the MME. The message contains the list of established E-RABs, the list of E-RABs that are not successfully established, and the destination-to-source transparent transmitter. Corresponding to the established RAB, it also contains tunnel information for downlink data transmission of the S1 interface. Corresponding to the established E-RAB, if the source base station proposes a downlink data forwarding, the data forwarding is feasible, and the target eNB accepts the downlink data forwarding, it includes, by the target base station, tunnel information for S1 interface data forwarding which is allocated by the E-UTRAN for each E-RAB for which the data forwarding is needed.

In operation 1009, the MME requests the SGW to create an indirect data forwarding tunnel. This step is performed only when indirect data forwarding needs to be performed. If the MME receives the S1 interface downlink tunnel information for data forwarding from the E-UTRAN, the MME requests the SGW to create an indirect data forwarding tunnel. The MME transmits the transport layer address and the TEID allocated by the eNB for data forwarding to the SGW. The transport layer address and the TEID are for each E-RAB.

The SGW transmits an indirect data forwarding tunnel creation response message to the MME. The message contains information for the data forwarding between the SGW and the UPF allocated by the SGW. The information for data forwarding between the SGW and the UPF includes a PDU session identity and/or the E-RAB information contained in the PDU session. The E-RAB information contains an E-RAB identity and the tunnel information used by the E-RAB for data forwarding. The tunnel information contains the transport layer address and the TEID allocated by the SGW. The SGW allocates downlink data forwarding tunnel information for the E-RAB which needs the downlink data forwarding. The SGW allocates uplink data forwarding tunnel information for the E-RAB which needs the uplink data forwarding. The data forwarding tunnel information contained in the E-RAB information may contain the uplink and/or downlink data forwarding tunnel information.

In operation 1010, the MME transmits a relocation response message to the AMF. The message includes the tunnel information allocated by the SGW for data forwarding. The tunnel information is for each EPS bear in the PDU session. The message contains a destination-to-source transparent transmitter. The MME transmits the E-RAB information contained in the PDU session and the tunnel information for data forwarding allocated by the SGW to each E-RAB to the AMF.

The message contains information for the data forwarding between the SGW and the UPF allocated by the SGW. The information for data forwarding between the SGW and the UPF includes a PDU session identity and/or the E-RAB information contained in the PDU session. The E-RAB information contains an E-RAB identity and the tunnel information used by the E-RAB for data forwarding. The information for data forwarding between the SGW and the UPF contains the tunnel information for data forwarding allocated by the SGW per E-RAB for each PDU session. The tunnel information for data forwarding may contains downlink and/or uplink data forwarding tunnel information.

The E-RAB information is transmitted directly to the AMF by the MME, and converted by the AMF.

In operation 1011, the AMF requests the SMF to create a data forwarding tunnel. The AMF transmits an indirect data forwarding tunnel create request message to the SMF. The message contains information of the PDU session. The information of the PDU session contains a PDU session identity, information of the QoS flows contained in the PDU session, the number of EPS bearers for each PDU session in the EPS system for which the data forwarding is needed, the mapping between the QoS flow and the EPS bearer, the EPS bearer identity and/or the QoS information of the EPS bearer. The message contains information for data forwarding received from the MME.

In operation 1012, the SMF transmits an N4 session modification message to the UPF. The message contains information of the PDU session. The information of the PDU session contains a PDU session identity, information of the QoS flows contained in the PDU session, the number of EPS bearers for each PDU session in the EPS system for which the data forwarding is needed, the mapping between the QoS flow and the EPS bearer, the EPS bearer identity and/or the QoS information of the EPS bearer. The message contains information for data forwarding received from the AMF.

The N4 session modification message includes EPS bearer information contained in the PDU session. The EPS bearer information contains an EPS bearer identity and the tunnel information of the EPS bearer for data forwarding. The SMF informs the UPF of the correspondence between the QoS flow and the EPS bearer in the PDU session. The UPF knows the QoS flow information of the PDU session in the 5G system. The UPF receives the EPS bearer information contained in the PDU session and the mapping relationship between the QoS flow and the EPS bearer from the SMF.

The UPF allocates tunnel information for data forwarding between the NG-RAN or UPF, and transmits it to the SMF. The UPF allocates tunnel information for each PDU session. The tunnel information includes a transport layer address and a TEID.

The UPF transmits the allocated tunnel information for data forwarding to the SMF. The SMF receives the N4 session modification response message from the UPF The message contains the tunnel information allocated by the UPF for data forwarding between the NG-RAN and the UPF.

In operation 1013, the SMF transmits an indirect data forwarding tunnel response message to the AMF. The message contains the tunnel information allocated by the UPF for data forwarding between the NG-RAN and the UPF.

In operation 1014, the AMF transmits a handover command message to the NG-RAN. The message contains a destination-to-source transparent transmitter and the tunnel information allocated by the UPF for data forwarding. The message further contains information of established PDU sessions and information of PDU sessions that are not successfully established. The information of established PDU sessions contains information of established QoS flows and information of QoS flows that are not successfully established. The tunnel information for data forwarding is for each PDU session.

In operation 1015, the NG-RAN transmits a handover command message to the UE.

The NG-RAN forwards data to the UPF. The NG-RAN forwards the data to the UPF on the corresponding tunnel for the PDU session for which the data forwarding is needed.

The NG-RAN transmits the data of each QoS flow for which the data forwarding is accepted to the UPF on the user plane tunnel allocated for the PDU session. For downlink data, the NG-RAN transmits downlink packets to the UPF on the tunnel allocated for downlink data forwarding.

The UPF forwards the data to the SGW. The UPF directly forwards the data received from the NG-RAN to the SGW via the user plane tunnel allocated for the corresponding EPS bearer. The SGW forwards the data directly to the target base station. The UPF forwards the data of different QoS flows in the PDU session to the SGW via the user plane tunnels allocated for corresponding EPS bearers according to the mapping relationship between the QoS flow and the EPS bearer. According to the mapping relationship between the QoS flow and the EPS bearer and the information of the EPS bearer for which the data forwarding is accepted, the UPF knows the QoS flow for which the data forwarding is accepted, and the UPF forwards the data of the QoS flow for which the data forwarding is accepted to the user plane tunnel allocated for the corresponding EPS bearer to forward it to the SGW. Corresponding to the QoS flow for which the data forwarding is not accepted, there is no corresponding data forwarding tunnel, and the UPF discards the data. The SGW directly forwards the data to the target base station.

The SGW forwards the data to the E-UTRAN. The SGW transmits the data, which is received from the UPF on the tunnel corresponding to each EPS bearer, to the E-UTRAN via the corresponding tunnel allocated by the E-UTRAN, that is, the UPF performs a mapping of multiple tunnels to one tunnel. The SGW forwards the data to the E-UTRAN according to the session transmission mode in the EPS.

During the PDU session establishment or GBR QoS flow establishment process, the UE receives the EPS QoS information and/or EPS bearer identification information mapped to the QoS flow from the network. The UE associates the correspondence between the ongoing QoS flow and the EPS bearer identity contained in the handover command message. For the QoS flow without a corresponding EPS bearer, the UE may delete it.

In operation 1016, the UE transmits a handover complete message to the E-UTRAN.

In operation 1017, the E-UTRAN transmits a handover complete message to the MME. The message contains the tunnel information allocated by the E-UTRAN for downlink data transmission.

In operation 1018, the MME transmits a bearer modification request message to the SGW. The message contains the tunnel information of the S1 interface for downlink data transmission.

In operation 1019, the SGW transmits the bearer modification request message to the UPF (PGW-U).

The SMF may also have the function of the PGW control plane. The SGW allocates tunnel information for downlink data transmission between the SGW and the UPF, where the tunnel information corresponds to each EPS bearer or each PDU session.

In operation 1020, the SMF requests a UPF session modification. The SMF may also have the function of the PGW control plane. The SMF transmits to the UPF the tunnel information for downlink data transmission between the SGW and the UPF allocated by the SGW, where the tunnel information corresponds to each EPS bearer or each PDU session. The UPF transmits a session modification response to the SMF. The UPF allocates tunnel information for uplink data transmission between the SGW and the UPF, and the UPF transmits the tunnel information for uplink data transmission to the SMF.

In operation 1021, the SMF transmits a bearer modification response message to the SGW. The message contains the tunnel information allocated by the UPF for uplink data transmission between the SGW and the UPF.

In operation 1022*a*, the UPF transmits one or several end marker packet(s) to the source NG-RAN in PDU session tunnel. The UPF starts to transmit downlink data to the SGW, and the SGW transmits the downlink data to the E-UTRAN.

In operation 1022*b*, the source base station sends one or several end marker packet(s) to the UPF via the tunnel of the PDU session, if the data forwarding of the QoS flows mapped to an E-RAB is completed according to the mapping of an E-RAB and a QoS flow. The end marker packet contains the QFI of one QoS flow mapped to the E-RAB. The source base station does not need to wait until the packets of all the QoS flows of the PDU session are forwarded and then transmit an end marker on the corresponding tunnel. The source base station transmits an end marker after the data forwarding for QoS flow(s) mapped to each E-RAB has been completed, and the end marker packet contains the QFI of one QoS flow mapped to the E-RAB. The source base station adds the QFI to the header of the end marker packet. The UPF removes the QFI from the end marker packet(s) and transmits it to the SGW via a tunnel of the corresponding EPS bearer based on the mapping of a QoS flow and an EPS bearer. If the packet header contains a RQI, the UPF also removes the RQI before transmitting it to the SGW. The packet format of the end marker transmitted to the SGW is the same as that in the EPS system.

The target E-UTRAN first transmits the received forwarded data to the UE, and then transmits the data from the core network.

In operation 1022*c*, the SGW transmits the received end marker to the E-UTRAN.

In operation 1023, the SGW transmits a bearer modification response message to the MME.

Thus, the description about method 4 of the disclosure has been completed. By using the method, the target base station can start the transmission of the packets received from the core network as soon as possible, so as to reduce the packet transmission delay during the data forwarding and improve the user experience. Furthermore, the UPF is simple in its behaviors, and performs a consistent handling of the end marker transmission for intra-system handover and inter-system handover, avoiding additional modifications to the UPF. For the forwarded normal packets and end markers, the UPF performs a consistent handling.

Figure 11:
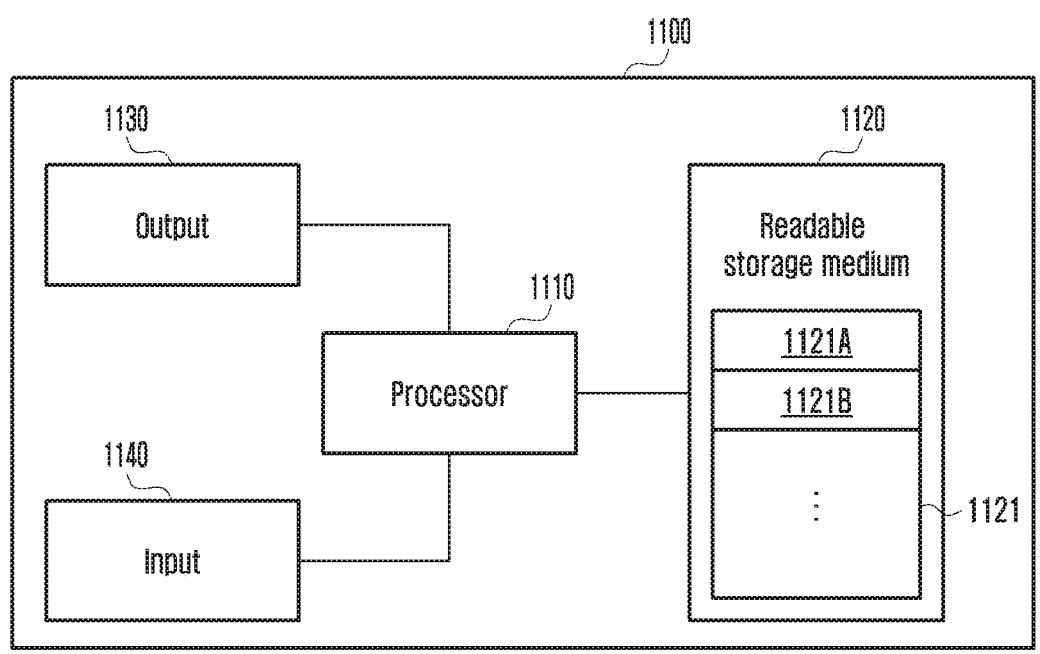
FIG. 11 schematically illustrates a block diagram of a computing system that can be used to implement the base station or the network node of the disclosure, according to an embodiment of the disclosure.

FIG. 11 schematically illustrates a block diagram of a computing system that can be used to implement the base station or the network node (e.g. UPF) of the disclosure, according to an embodiment of the disclosure.

As shown in FIG. 11, the computing system 1100 includes a processing unit 1110, a computer readable storage medium 1120, an output interface 1130, and an input interface 1140. The computing system 1100 can perform the handover supporting methods described above with respect to FIGS. 3, 4, 5A and 5B, 6A and 6B, 7, 8, 9, 10A and 10B.

Particularly, the processing unit 1110 may include, for example, a general-purpose microprocessor, an instruction set processor and/or a related chipset and/or a dedicated microprocessor (e.g., an application specific integrated circuit (ASIC)), and/or a digital signal processor (DSP), and the like. The processing unit 1110 may also include an onboard memory for caching purposes. The processing unit 1110 may be a single processing unit or multiple processing units for performing different actions of a method described with respect to FIGS. 3, 4, 5A and 5B, 6A and 6B, 7, 8, 9, 10A and 10B.

The computer readable storage medium 1120, for example, may be any medium that can contain, store, communicate, propagate or transmit instructions. For example, a readable storage medium may include, but is not limited to, an electronic, magnetic, optical, electromagnetic, infrared, or semiconductor system, apparatus, device, or propagation medium. Specific examples of the readable storage medium include: a magnetic storage device such as a magnetic tape or a hard disk (HDD); an optical storage device such as a compact disk (CD-ROM); a memory such as a random access memory (RAM) or a flash memory; and/or a wired/Wireless communication link.

The computer readable storage medium 1120 may contain a computer program 1121 that may include code/computer executable instructions that, when executed by the processing unit 1110, cause the processing unit 1110 to perform, for example, method flows described above with respect to FIGS. 3, 4, 5A and 5B, 6A and 6B, 7, 8, 9, 10A and 10B and any variations thereof.

The computer program 1121 may be configured to have computer program codes thereon, which, for example, include a computer program module. For example, in an example embodiment, the codes in the computer program 1121 may include one or more program modules, including, for example, module 1121A, module 1121B, etc. It should be noted that the division manner and number of modules are not fixed, and those skilled in the art may use suitable program modules or program module combinations according to actual situations. When these program module combinations are executed by the processing unit 1110, it causes the processing unit 1110 to be able to perform, for example, method flows described above with respect to FIGS. 3, 4, 5A and 5B, 6A and 6B, 7, 8, 9, 10A and 10B and any variations thereof.

The method and apparatus involved in the disclosure have been described above with respect to the preferred embodiments. Embodiments of the disclosure provide a handover supporting method and a corresponding apparatus, thereby the delay problem of data transmitted to the UE in the data forwarding process can be addressed, the data interruption time can be reduced, the service continuity is ensured and the user experience is improved.

Those skilled in the art will appreciate that the methods shown above are merely exemplary. The method of the disclosure is not limited to the steps and orders shown above. For example, steps performed by different entities may be processed in parallel. Furthermore, steps of the method illustrated above may be performed by corresponding modules in corresponding devices, or may be performed by a combination of hardware and program instructions. Many variations and modifications may be made by those skilled in the art in view of the teachings of the illustrated embodiments.

It should be understood that the above-described embodiments of the disclosure may be implemented by software, hardware, or a combination of both software and hardware. For example, the tunnel estimation apparatus or various components in the base station in the above embodiments may be implemented by various devices including, but not limited to, an analog circuit device, a digital circuit device, a DSP circuit, a programmable processor, an ASIC, a field programmable gate array (FPGA), a programmable logic device (CPLD), and the like.

In the disclosure, the "base station" refers to a mobile communication data and control switching center having a large transmission power and a relatively large coverage area, including functions such as resource allocation scheduling, data reception and transmission, and the like. The "source base station" and the "target base station" are named with respect to the handover procedure. The "user equipment" refers to a user mobile terminal, for example, a terminal device including a mobile phone, a notebook, etc., which can perform wireless communication with a base station or a micro base station.

Moreover, embodiments of the disclosure disclosed herein can be implemented on a computer program product. More specifically, the computer program product is a product having a computer readable medium encoded with computer program logic that, when executed on a computing device, provides related operations to implement the above technical solution of the disclosure. The computer program logic, when executed on at least one processor of a computing system, causes the processor to perform the operations (methods) described in the embodiments of the disclosure. Such an arrangement of the disclosure is typically provided as software, code, and/or other data structures that are arranged or encoded on a computer readable medium such as an optical medium (e.g., CD-ROM), floppy disk, or hard disk, and the like, or other medium such as firmware and microcode on one or more read-only memory (ROM) or RAM or programmable ROM (PROM) chips, or downloadable software images, shared databases, etc. in one or more modules. Software or firmware or such a configuration may be installed on the computing device such that one or more processors in the computing device perform the technical solutions described in the embodiments of the disclosure.

While the disclosure has been shown and described with reference to various embodiments thereof, it will be understood by those skilled in the art that various changes in form and details may be made therein without departing from the spirit and the scope of the disclosure as defined by the appended claims and their equivalents.

What is claimed is:

1. A method performed by a source base station related to a first radio access technology (RAT), the method comprising:
    forwarding data to a target base station related to a second RAT;
    receiving, from a User Plane Function (UPF), at least one of first end marker packets over a protocol data unit (PDU) session tunnel; and
    transmitting, to the UPF, at least one of second end marker packets including a quality of service (QoS) flow identity (QFI) for each QoS flow mapped to a data bearer over the PDU session tunnel, in case that the data forwarding for the each QoS flow mapped to the data bearer has been completed,
    wherein the first RAT is different from the second RAT, and
    wherein the QFI is removed from the at least one of second end marker packets by the UPF, based on the mapping of the each QoS flow and the data bearer, before the at least one of the second end marker packets is sent to a serving gateway (SGW) related to the second RAT.

2. The method of claim 1, wherein the at least one of first end marker packets from the UPF contains the QFI.

3. The method of claim 2, wherein both the source base station and the target base station belong to a network supporting QoS flows.

4. The method of claim 2, wherein the source base station belongs to a network supporting QoS flows and the target base station belongs to a network not supporting QoS flows.

5. The method of claim 2, wherein the forwarding of the data to the target base station comprises forwarding the data directly to the target base station or forwarding the data to the target base station via the UPF.

6. The method of claim 1, wherein the transmitting of the at least one of second end marker packets comprises:
    transmitting, to the UPF, the at least one of second end marker packets in case that the data forwarding of the each QoS flow mapped to a corresponding radio access bearer has been completed regardless of whether all QoS flow packets are delivered.

7. The method of claim 1, wherein both the source base station and the target base station belong to a network supporting QoS flows.

8. The method of claim 1, wherein the source base station belongs to a network supporting QoS flows and the target base station belongs to a network not supporting QoS flows.

9. The method of claim 1, wherein the forwarding of the data to the target base station comprises forwarding the data directly to the target base station or forwarding the data to the target base station via the UPF.

10. A method performed by a User Plane Function (UPF), the method comprising:
- transmitting, to a source base station, at least one of first end marker packets over a protocol data unit (PDU) session tunnel;
- receiving, from the source base station, at least one of second end marker packets including a quality of service (QoS) flow identity (QFI) for each QoS flow mapped to a data bearer over the PDU session tunnel, in case that data forwarding for the each QoS flow mapped to the data bearer has been completed; and
- removing the QFI from the at least one of second end marker packets, based on the mapping of the each QoS flow and the data bearer, before the at least one of the second end marker packets is sent to a serving gateway (SGW) related to a second RAT,
- wherein the data is forwarded from the source base station related to a first radio access technology (RAT) to a target base station related to the second RAT, and
- wherein the first RAT is different from the second RAT.

11. A source base station related to a first radio access technology (RAT), the source base station comprising:
- a processor;
- a memory, coupled to the processor, configured to store machine readable instructions that, when executed by the processor, configure the processor to perform:
  - forwarding data to a target base station related to a second RAT;
  - receiving, from a User Plane Function (UPF), at least one of first end marker packets over a protocol data unit (PDU) session tunnel; and
  - transmitting, to the UPF, at least one of second end marker packets including a quality of service (QoS) flow identity (QFI) for each QoS flow mapped to a data bearer over the PDU session tunnel, in case that the data forwarding for the each QoS flow mapped to the data bearer has been completed, wherein the first RAT is different from the second RAT, and wherein the QFI is removed from the at least one of second end marker packets by the UPF, based on the mapping of the each QoS flow and the data bearer, before the at least one of the second end marker packets is sent to a serving gateway (SGW) related to the second RAT.

12. A User Plane Function (UPF) comprising:

a processor;

a memory, coupled to the processor, configured to store machine readable instructions that, when executed by the processor, configure the processor to perform:
- transmitting, to a source base station, at least one of first end marker packets over a protocol data unit (PDU) session tunnel;
- receiving, from the source base station, at least one of second end marker packets including a quality of service (QoS) flow identity (QFI) for each QoS flow mapped to a data bearer over the PDU session tunnel, in case that data forwarding for the each QoS flow mapped to the data bearer has been completed;
- removing the QFI from the at least one of second end marker packets, based on the mapping of the each QoS flow and the data bearer, before the at least one of the second end marker packets is sent to a serving gateway (SGW) related to a second RAT, wherein the data is forwarded from the source base station related to a first radio access technology (RAT) to a target base station related to the second RAT; and wherein the first RAT is different from the second RAT.

* * * * *